(12) United States Patent
Hoshino et al.

(10) Patent No.: US 8,588,321 B2
(45) Date of Patent: Nov. 19, 2013

(54) WIRELESS COMMUNICATION APPARATUS, WIRELESS COMMUNICATION SYSTEM AND WIRELESS COMMUNICATION METHOD

(75) Inventors: Masayuki Hoshino, Kanagawa (JP); Katsuhiko Hiramatsu, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 663 days.

(21) Appl. No.: 12/809,701

(22) PCT Filed: Oct. 23, 2008

(86) PCT No.: PCT/JP2008/003011
§ 371 (c)(1),
(2), (4) Date: Jul. 29, 2010

(87) PCT Pub. No.: WO2009/081514
PCT Pub. Date: Jul. 2, 2009

(65) Prior Publication Data
US 2010/0290548 A1 Nov. 18, 2010

(30) Foreign Application Priority Data

Dec. 25, 2007 (JP) ................................ P2007-332580
May 13, 2008 (JP) ................................ P2008-125873

(51) Int. Cl.
*H04K 1/10* (2006.01)
(52) U.S. Cl.
USPC ........................... 375/267; 375/260; 375/278
(58) Field of Classification Search
USPC ......... 375/260, 267, 278, 299, 254; 455/63.1, 455/114.2, 296, 501, 67.13; 370/329
See application file for complete search history.

(56) References Cited

U.S. PATENT DOCUMENTS 6,785,341 B2   8/2004   Walton et al.
6,941,153 B2   9/2005   Kim et al.
(Continued)

FOREIGN PATENT DOCUMENTS

JP   2003-78461 A    3/2003
JP   2004-533169 A   10/2004
(Continued)

OTHER PUBLICATIONS

Yang Song, Liyu Cai, Keying Wu, Hongwei Yang, "Collaborative MIMO", IEEE 802.16 Broadband Wireless Access Working Group, Alcatel-Lucent, Nov. 7, 2007.*

(Continued)

*Primary Examiner* — Aristocratis Fotakis
(74) *Attorney, Agent, or Firm* — Pearne & Gordon LLP

(57) ABSTRACT

When power scaling is applied to multi-user MIMO, a reduction in transmission rate is suppressed and transmission efficiency is improved. When signals are transmitted through spatial multiplexing from a wireless base station 11 to a plurality of pieces of user equipment 12 and 13, notification of a transmission parameter (MCS) of the distant user equipment (UE-B) 13 is provided as control information to the adjacent user equipment (UE-A) 12. The user equipment 12 calculates, based on the received control information, a reception quality (CQI) after cancellation of a signal serving as an interference signal and destined for the other user equipment 13, and feeds back the calculated result to the wireless base station 11. Based on this feedback, the wireless base station 11 sets a transmission parameter (MCS) of each piece of the user equipment 12 and 13 using the CQI after the cancellation, and transmits signals intended for respective users through spatial multiplexing after performing power distribution between the users by power scaling.

19 Claims, 14 Drawing Sheets

(56) References Cited

U.S. PATENT DOCUMENTS

| | | |
|---|---|---|
| 7,054,378 B2 | 5/2006 | Walton et al. |
| 7,920,889 B2 | 4/2011 | Hoshino et al. |
| 8,345,562 B2 | 1/2013 | Hoshino et al. |
| 2006/0120477 A1* | 6/2006 | Shen et al. .................. 375/267 |
| 2007/0099578 A1* | 5/2007 | Adeney et al. ................ 455/69 |
| 2007/0099665 A1* | 5/2007 | Kim et al. .................... 455/561 |
| 2007/0248172 A1* | 10/2007 | Mehta et al. ................. 375/260 |
| 2008/0008110 A1 | 1/2008 | Kishigami et al. |
| 2008/0175185 A1* | 7/2008 | Ji et al. ........................ 370/318 |
| 2008/0233967 A1* | 9/2008 | Montojo et al. ........... 455/452.2 |
| 2009/0016263 A1 | 1/2009 | Kishigami et al. |
| 2009/0028112 A1* | 1/2009 | Attar et al. ................... 370/332 |
| 2009/0036083 A1* | 2/2009 | Darwood ..................... 455/296 |
| 2009/0046573 A1* | 2/2009 | Damnjanovic ............... 370/216 |
| 2009/0047971 A1* | 2/2009 | Fu ................................ 455/450 |
| 2009/0067375 A1* | 3/2009 | Wong et al. .................. 370/329 |
| 2009/0116389 A1* | 5/2009 | Ji et al. ........................ 370/235 |
| 2009/0227211 A1 | 9/2009 | Hoshino et al. |
| 2009/0268621 A1 | 10/2009 | Hoshino et al. |
| 2010/0020702 A1* | 1/2010 | Wong et al. .................. 370/252 |
| 2011/0122971 A1* | 5/2011 | Kim et al. .................... 375/316 |

FOREIGN PATENT DOCUMENTS

| | | |
|---|---|---|
| WO | 2005/114874 A1 | 12/2005 |
| WO | 2006/080352 A1 | 8/2006 |
| WO | 2006/129661 A1 | 12/2006 |
| WO | 2006/129749 A1 | 12/2006 |

OTHER PUBLICATIONS

Qualcomm Europe et al; 3GPP TSG RAN WG1 #42, R1-050912, "MIMO proposal for MIMO-WCDMA evaluation", Aug. 29-Sep. 2, 2005, pp. 1-21.

Texas Instruments et al; 3GPP TSG RAN WG1 #42, R1-050724, "MIMO OFDMA Techniques for Downlink E-UTRA", Aug. 29-Sep. 2, 2005, pp. 1-6.

International Search Report for PCT/JP2008/003011 dated Feb. 3, 2009.

* cited by examiner

FIG.14
(A)
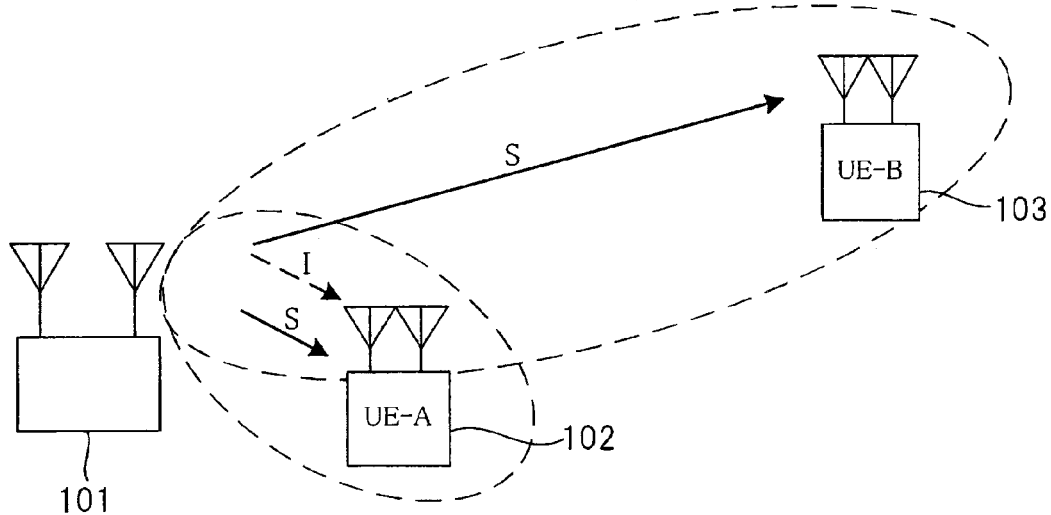
(B)
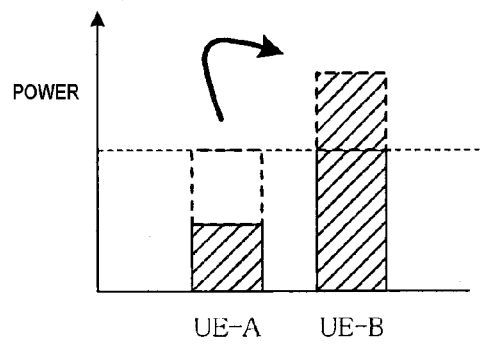

WIRELESS COMMUNICATION APPARATUS, WIRELESS COMMUNICATION SYSTEM AND WIRELESS COMMUNICATION METHOD

TECHNICAL FIELD

The present invention relates to a wireless communication apparatus, a wireless communication system and a wireless communication method, which are applicable to MIMO (Multiple-Input Multiple-Output) and the like in which communication is performed using a plurality of antennas.

BACKGROUND ART

In recent years, attention has been given to MIMO (Multiple-Input Multiple-Output) as a technology for implementing high-speed and large-capacity communication in a wireless communication technique. MIMO refers to a technology for transmitting data using a plurality of antennas in both of reception and transmission. This technology enables, without increasing time and frequency resources, an improvement in transmission capacity by transmitting different pieces of data from a plurality of transmission antennas, and is receiving attention as a system for implementing high-speed transmission by utilizing a limited frequency band effectively.

Above all, in multi-user MIMO in which MIMO channels are formed by a plurality of users, transmission beam control is applied, or more specifically, among specified beam patterns, a beam corresponding to feedback from each user is used, thereby allowing signal strength to be ensured at the time of transmission to the relevant user. Moreover, a different beam can accommodate other user, and a multi-user diversity effect capable of improving transmission efficiency is obtained by appropriately selecting a user for simultaneous transmission.

Furthermore, at present, 3GPP (3rd Generation Partnership Project), which is an international standardization organization for mobile phones, is conducting standardization activities for an LTE (Long Term Evolution) system as a system for implementing communication speed and capacity higher than those of the current third-generation mobile phones. Also in this LTE, MIMO takes its place as an essential technique in order to meet conditions required for high-speed and large-capacity transmission. Besides, in this LTE, a transmission beam technique is discussed as a "Pre-coding" (hereinafter referred to as "preceding") technique.

FIG. 13 is a diagram schematically illustrating data transmission carried out by multi-user MIMO. For example, at the time of multi-antenna transmission from a wireless base station 101 for use in a cellular system for communication of mobile units such as mobile phones, data is transmitted to first user equipment (UE-A) 102 and second user equipment (UE-B) 103, each serving as a mobile station, with the use of beams suitable to the respective equipments. In this case, a beam number indicative of an optimal beam pattern among a plurality of beams is set for each piece of user equipment 102 and 103 based on its reception quality, and this beam number and a CQI (Channel Quality Indicator) indicative of the reception quality are fed back to the wireless base station 101. In the example of FIG. 13, data is transmitted to the user equipment (UE-A) 102 using a beam 2, and data is transmitted to the user equipment (UE-B) 103 using a beam 3.

Further, in the cellular system to which multi-user MIMO is applied, studies are conducted on power scaling for changing power distribution between users, thereby ensuring the signal strength of a cell edge user located at a peripheral edge of a cell.

FIG. 14 provides diagrams schematically illustrating operations to be performed at the time of power scaling in multi-user MIMO, in which (A) is a diagram illustrating beams emitted to respective user equipments and (B) is a diagram illustrating power allocated to the respective user equipments. In the example of FIG. 14, the user equipment (UE-A) 102 is located in the vicinity of the wireless base station 101, and the user equipment (UE-B) 103 is located at a cell edge. Furthermore, power scaling is carried out to allocate a large amount of power to the user equipment (UE-B) 103 located at the cell edge and to reduce power allocated to the adjacent user equipment (UE-A) 102, with the overall power kept constant. In this case, a transmission signal S transmitted from the wireless base station 101 to the user equipment (UE-B) 103 increases in power and thus becomes an interference signal I for the user equipment (UE-A) 102, resulting in an increase in the level of the interference signal I for the user equipment (UE-A) 102. Accordingly, the influence of interference between users, which has been reduced by a beam in multi-user MIMO, is increased, and therefore, the rate of transmission to the user equipment in the vicinity of the base station is reduced.

Non-Patent Document 1: 3GPP TSG RAN WG1 #42, R1-050912, Qualcomm Europe, "MIMO proposal for MIMO-WCDMA evaluation", Aug. 29-Sep. 2, 2005
Non-Patent Document 2: 3GPP TSG RAN WG1 #42, R1-050724, Texas Instruments, "MIMO OFDMA Techniques for Downlink E-UTRA", Aug. 29-Sep. 2, 2005
Patent Document 1: JP-A-2003-78461

DISCLOSURE OF THE INVENTION

Problems to be Solved by the Invention

As described above, when power scaling is applied to multi-user MIMO, a large amount of power is applied to user equipment at a cell edge, resulting in an increase in the influence of interference between users, which has been reduced by a beam. Thus, there occurs a problem that the rate of transmission to user equipment in the vicinity of a base station is reduced.

The present invention has been made in view of the above-described circumstances, and its object is to provide a wireless communication apparatus, a wireless communication system and a wireless communication method, which are capable of suppressing a reduction in transmission rate and improving transmission efficiency when power scaling is applied to multi-user MIMO.

Solution to the Problems

The present invention provides, as a first aspect, a wireless communication apparatus used in a wireless communication system for performing communication from a transmitting device to a plurality of receiving devices using a plurality of antennas, the wireless communication apparatus comprising: a reception quality calculator for receiving, from the transmitting device, control information destined for the other receiving device, and for calculating, based on a transmission parameter destined for the other receiving device included in the control information, a reception quality of a signal destined for the own apparatus when a signal destined for the other receiving device is cancelled; and a feedback information transmission section for transmitting, to the transmitting device, feedback information including the reception quality when cancelled.

Thus, even if an interference signal is high and the reception quality is degraded, for example, a high level modulation system can be used as a signal parameter as long as the removal of the interference signal is enabled, and therefore, a reduction in transmission rate can be suppressed. Accordingly, when power scaling is applied to multi-user MIMO, the receiving device, which is located in the vicinity of the transmitting device and to which power allocation is reduced, for example, feeds back the reception quality of the signal destined for the own device when the other-receiving-device-destined signal is cancelled, thus making it possible to suppress a reduction in transmission rate and to improve transmission efficiency even if the interference signal resulting from the other-receiving-device-destined signal or the like is high.

The present invention includes, as a second aspect, the wireless communication apparatus, wherein the wireless communication apparatus comprises a cancellation capability notification section for notifying, in advance, the transmitting device that there is the capability of canceling the signal destined for the other receiving device.

The present invention includes, as a third aspect, the wireless communication apparatus, wherein the wireless communication apparatus comprises a demodulator for demodulating the signal destined for the own apparatus while canceling the signal destined for the other receiving device with respect to a reception signal using the transmission parameter destined for the other receiving device.

The present invention includes, as a fourth aspect, the wireless communication apparatus, wherein the reception quality calculator receives, as the control information destined for the other receiving device, control information of a cell-edge-oriented signal of a cellular system, and calculates, based on a transmission parameter of the cell-edge-oriented signal included in the control information, the reception quality of the signal destined for the own apparatus when the cell-edge-oriented signal is cancelled.

Thus, even if an interference signal resulting from the cell-edge-oriented signal of the cellular system is high and the reception quality is degraded, for example, a high level modulation system can be used as a signal parameter as long as the removal of the cell-edge-oriented signal is enabled, and therefore, a reduction in transmission rate can be suppressed. Accordingly, when power scaling is applied to multi-user MIMO, the receiving device, located in the vicinity of the transmitting device, for example, feeds back the reception quality of the signal destined for the own device when the cell-edge-oriented signal is cancelled, thus making it possible to suppress a reduction in transmission rate and to improve transmission efficiency even if power allocation is low and the interference signal resulting from the cell-edge-oriented signal or the like is high.

The present invention includes, as a fifth aspect, the wireless communication apparatus, wherein the wireless communication apparatus comprises a cancellation-capable bit number judging section for judging a cancelable bit number of the signal destined for the other receiving device in a receiving situation in which the transmission parameter destined for the other receiving device is envisaged, wherein the reception quality calculator calculates, in accordance with the cancellation-capable bit number resulting from the judgment, the reception quality of the signal destined for the own apparatus when the signal destined for the other receiving device is cancelled, and wherein the feedback information transmission section transmits, to the transmitting device, feedback information including: the reception quality after the cancellation; and the cancellation-capable bit number.

Thus, the measurement of the reception quality, in which the transmission parameter such as MCS destined for the other receiving device is utilized, is enabled, and the cancelable bit number of the other-receiving-device-destined signal and the reception quality after the cancellation of the other-receiving-device-destined signal can be fed back in a receiving situation in which the transmission parameter destined for the other receiving device is envisaged.

The present invention includes, as a sixth aspect, the wireless communication apparatus, wherein the wireless communication apparatus comprises a power correction value judging section for judging a power correction value capable of canceling the signal destined for the other receiving device in a receiving situation in which the transmission parameter destined for the other receiving device is envisaged, wherein the reception quality calculator calculates, in accordance with the power correction value destined for the other receiving device resulting from the judgment, the reception quality of the signal destined for the own apparatus when the signal destined for the other receiving device is cancelled, and wherein the feedback information transmission section transmits, to the transmitting device, feedback information including: the reception quality after the cancellation; and the power correction value destined for the other receiving device.

Thus, the power correction value at the time of transmission power distribution for a plurality of receiving-device-destined signals can be controlled by utilizing the transmission parameter such as MCS destined for the other receiving device.

The present invention includes, as a seventh aspect, the wireless communication apparatus, wherein the wireless communication apparatus comprises a cancellation-capable frequency band judging section for judging a frequency band capable of canceling the signal destined for the other receiving device in a receiving situation in which the transmission parameter destined for the other receiving device is envisaged, wherein the reception quality calculator calculates, in accordance with cancellation-capable frequency band information resulting from the judgment, the reception quality of the signal destined for the own apparatus when the signal destined for the other receiving device is cancelled for each frequency band, and wherein the feedback information transmission section transmits, to the transmitting device, feedback information including: the reception quality after the cancellation; and the cancellation-capable frequency band information.

Thus, the frequency band capable of canceling the other-receiving-device-destined signal can be judged by utilizing the transmission parameter such as MCS destined for the other receiving device, and the cancellation-capable frequency band information and the reception quality after the cancellation of the other-receiving-device-destined signal can be fed back.

The present invention provides, as an eighth aspect, a wireless communication apparatus used in a wireless communication system for performing communication from a transmitting device to a plurality of receiving devices using a plurality of antennas, the wireless communication apparatus comprising: a control information retaining section for retaining control information including a transmission parameter destined for the other receiving device other than the relevant receiving device; a control information notification section for notifying the receiving device of the control information destined for the other receiving device; and a signal transmission section for receiving feedback information from the receiving device to which the notification is provided, for setting a transmission parameter of a signal destined for the relevant receiving device based on a reception quality of a signal destined for the own device when an other-receiving-device-destined signal included in the feedback information is cancelled, and for performing spatially-multiplexed transmission after performing transmission power distribution for signals destined for the plurality of receiving devices.

Thus, when power scaling is applied to multi-user MIMO, the receiving device is notified of the control information including the transmission parameter destined for the other receiving device, and the transmission parameter of the signal destined for the relevant receiving device is set based on the reception quality of the signal destined for the own device when the other-receiving-device-destined signal included in the feedback information from the receiving device is cancelled; hence, even if an interference signal resulting from the other-receiving-device-destined signal or the like is high in the receiving device which is located in the vicinity of the transmitting device and to which power allocation is low, for example, a reduction in transmission rate can be suppressed, and transmission efficiency can be improved.

The present invention includes, as a ninth aspect, the wireless communication apparatus, wherein the control information retaining section retains, as the control information destined for the other receiving device, control information including a transmission parameter of a cell-edge-oriented signal of a cellular system, and wherein the control information notification section announces the control information of the cell-edge-oriented signal to the receiving device within a cell of the cellular system.

Thus, when power scaling is applied to multi-user MIMO, the receiving device is notified of the control information including the transmission parameter of the cell-edge-oriented signal of the cellular system, and the transmission parameter of the signal destined for the relevant receiving device is set based on the reception quality of the signal destined for the own device when the cell-edge-oriented signal included in the feedback information from the receiving device is cancelled; hence, even if power allocation is low and an interference signal resulting from the cell-edge-oriented signal or the like is high in the receiving device located in the vicinity of the transmitting device, for example, a reduction in transmission rate can be suppressed, and transmission efficiency can be improved.

The present invention includes, as a tenth aspect, the wireless communication apparatus, wherein the signal transmission section sets a transmission parameter of a signal destined for the relevant receiving device based on a reception quality of a signal destined for the own device when a cell-edge-oriented signal, included in feedback information from the receiving device to which the announcement is provided, is cancelled, and performs spatially-multiplexed transmission after performing transmission power distribution for the signal destined for the receiving device and the cell-edge-oriented signal.

The present invention includes, as an eleventh aspect, the wireless communication apparatus, wherein the signal transmission section sets a transmission parameter of a signal destined for the relevant receiving device based on: a reception quality of a signal destined for the own device when the other-receiving-device-destined signal included in the feedback information is cancelled; and a cancellation-capable bit number indicative of the number of cancelable bits of the other-receiving-device-destined signal.

Thus, based on the reception quality measured and fed back by utilizing the transmission parameter such as MCS destined for the other receiving device, the transmission parameters or the like of signals destined for a plurality of receiving devices can be appropriately set.

The present invention includes, as a twelfth aspect, the wireless communication apparatus, wherein the signal transmission section sets a transmission parameter of a signal destined for the relevant receiving device based on a reception quality of a signal destined for the own device when the other-receiving-device-destined signal included in the feedback information is cancelled, and performs transmission power distribution for a plurality of receiving-device-destined signals based on an other-receiving-device-destined signal power correction value indicative of a power correction value capable of canceling the other-receiving-device-destined signal included in the feedback information.

Thus, based on the power correction value judged and fed back by utilizing the transmission parameter such as MCS destined for the other receiving device, the transmission power distribution for a plurality of other-receiving-device-destined signals can be suitably executed.

The present invention includes, as a thirteenth aspect, the wireless communication apparatus, wherein the wireless communication apparatus comprises a scheduler for setting: frequency bands of signals destined for the plurality of receiving devices; and transmission parameters destined for the plurality of receiving devices, and wherein the scheduler sets the transmission parameters of signals destined for the plurality of receiving devices based on: a reception quality of a signal destined for the own device when the other-receiving-device-destined signal included in the feedback information is cancelled; and cancellation-capable frequency band information indicative of a frequency band capable of canceling the other-receiving-device-destined signal.

Thus, based on the reception quality and cancellation-capable frequency band information judged and fed back by utilizing the transmission parameter such as MCS destined for the other receiving device, scheduling for a plurality of receiving-device-destined signals can be suitably executed.

The present invention provides, as a fourteenth aspect, a wireless communication base station apparatus comprising the wireless communication apparatus according to any one of the above.

The present invention provides, as a fifteenth aspect, a wireless communication mobile station apparatus comprising the wireless communication apparatus according to any one of the above.

The present invention provides, as a sixteenth aspect, a wireless communication system for performing communication from a transmitting device to a plurality of receiving devices using a plurality of antennas, the wireless communication system comprising:

a receiving device including: a reception quality calculator for receiving, from the transmitting device, control information destined for the other receiving device, and for calculating, based on a transmission parameter destined for the other receiving device included in the control information, a reception quality of a signal destined for the own device when a signal destined for the relevant other receiving device is cancelled; and a feedback information transmission section for transmitting, to the transmitting device, feedback information including the reception quality after the cancellation, and the transmitting device including: a control information retaining section for retaining control information including a transmission parameter destined for the other receiving device other than the receiving device; a control information notification section for notifying the receiving device of the control information destined for the other receiving device; and a signal transmission section for receiving feedback information from the receiving device, for setting a transmission parameter of a signal destined for the relevant receiving device based on a reception quality of a signal destined for the own device when an other-receiving-device-destined signal included in the feedback information is cancelled, and for performing spatially-multiplexed transmission after performing transmission power distribution for signals destined for the plurality of receiving devices.

The present invention provides, as a seventeenth aspect, a wireless communication system used in a cellular system for performing communication from a transmitting device to a plurality of receiving devices using a plurality of antennas, the wireless communication system comprising:

a receiving device including: a reception quality calculator for receiving, from the transmitting device, control information of a cell-edge-oriented signal of the cellular system, and for calculating, based on a transmission parameter of the cell-edge-oriented signal included in the control information, a reception quality of a signal destined for the own device when the relevant cell-edge-oriented signal is cancelled; and a feedback information transmission section for transmitting, to the transmitting device, feedback information including the reception quality after the cancellation; and the transmitting device including: a control information retaining section for retaining the control information including the transmission parameter of the cell-edge-oriented signal; a control information notification section for announcing the control information of the cell-edge-oriented signal to the receiving device within a cell of the cellular system; and a signal transmission section for receiving the feedback information from the receiving device, for setting a transmission parameter of a signal destined for the relevant receiving device based on a reception quality of a signal destined for the own device when the cell-edge-oriented signal included in the feedback information is cancelled, and for performing spatially-multiplexed transmission after performing transmission power distribution for the signal destined for the receiving device and the cell-edge-oriented signal.

The present invention provides, as an eighteenth aspect, a wireless communication method for performing communication from a transmitting device to a plurality of receiving devices using a plurality of antennas, wherein the wireless communication method comprises a reception quality calculation step and a feedback information transmission step in the receiving device, the reception quality calculation step comprising: receiving, from the transmitting device, control information destined for the other receiving device; and calculating, based on a transmission parameter destined for the other receiving device included in the control information, a reception quality of a signal destined for the own device when a signal destined for the relevant other receiving device is cancelled, the feedback information transmission step comprising transmitting, to the transmitting device, feedback information including the reception quality after the cancellation, and wherein the wireless communication method comprises a control information notification step and a signal transmission step in the transmitting device, the control information notification step comprising notifying the receiving device of control information including a transmission parameter destined for the other receiving device other than the receiving device, the signal transmission step comprising: receiving feedback information from the receiving device; setting a transmission parameter of a signal destined for the relevant receiving device based on a reception quality of a signal destined for the own device when an other-receiving-device-destined signal included in the feedback information is cancelled; and performing spatially-multiplexed transmission after performing transmission power distribution for signals destined for the plurality of receiving devices.

The present invention provides, as a nineteenth aspect, a wireless communication method used in a cellular system for performing communication from a transmitting device to a plurality of receiving devices using a plurality of antennas, wherein the wireless communication method comprises a reception quality calculation step and a feedback information transmission step in the receiving device, the reception quality calculation step comprising: receiving, from the transmitting device, control information of a cell-edge-oriented signal of the cellular system; and calculating, based on a transmission parameter of the cell-edge-oriented signal included in this control information, a reception quality of a signal destined for the own device when the relevant cell-edge-oriented signal is cancelled, the feedback information transmission step comprising transmitting, to the transmitting device, feedback information including the reception quality after the cancellation, and wherein the wireless communication method comprises a control information notification step and a signal transmission step in the transmitting device, the control information notification step comprising announcing the control information including a transmission parameter of the cell-edge-oriented signal to the receiving device within a cell of the cellular system, the signal transmission step comprising: receiving the feedback information from the receiving device; setting a transmission parameter of a signal destined for the relevant receiving device based on a reception quality of a signal destined for the own device when the cell-edge-oriented signal included in this feedback information is cancelled; and performing spatially-multiplexed transmission after performing transmission power distribution for the signal destined for the receiving device and the cell-edge-oriented signal.

Advantageous Effects of the Invention

The present invention can provide a wireless communication apparatus, a wireless communication system and a wireless communication method, which are capable of suppressing a reduction in transmission rate and improving transmission efficiency when power scaling is applied to multi-user MIMO.

BRIEF DESCRIPTION OF THE DRAWINGS

FIG. 14 provides diagrams schematically illustrating operations to be performed at the time of power scaling in multi-user MIMO.

Figure 1:
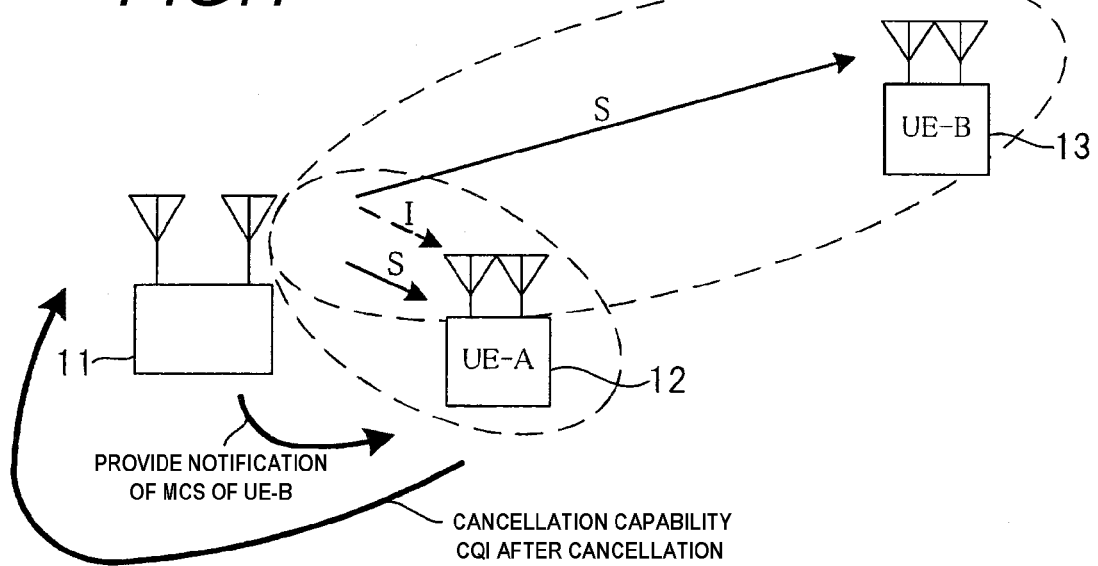
FIG. 1 is a diagram schematically illustrating operations to be performed at the time of power scaling in multi-user MIMO according to a first embodiment of the present invention.

DESCRIPTION OF REFERENCE CHARACTERS 11 wireless base station
12, 13 user equipment
211a, 211b antenna
212a, 212b reception RF section
213 channel estimator
214, 711 control signal demodulator
215 MIMO demodulator
216 decoder
217 CRC check section
218, 712, 832, 932, 1132 CQI measurement section
221, 833, 933, 1133 feedback information generator
222 encoder
223 multiplexer
224 transmission RF section
331, 1231 encoder
332, 1232 control signal generator
333, 1233 multiplexer
334, 1042 power scaling processing unit
335 precoding processing unit
336a, 336b transmission RF section
337a, 337b antenna
338 reception RF section
339, 1041, 1241 separation section
340 demodulator/decoder
341 CRC check section
342 other-receiving-device-destined control signal storage section
601-1, 601-N transmission processing unit
611 cell-edge-oriented signal control signal storage section
831 cancellation-capable bit number judging section
931 other-receiving-device-destined power correction value judging section
1131 subband-specific other-receiving-device-destined signal level judging section
1242 scheduler

BEST MODE FOR CARRYING OUT THE INVENTION

In the present embodiments, as examples of a wireless communication apparatus, a wireless communication system and a wireless communication method according to the present invention, there will be described a configuration example in which, in a wireless communication system adopting MIMO, multi-user MIMO for transmitting data from a transmitting device to a plurality of receiving devices (a plurality of users) is adopted to perform signal transmission. In these embodiments, precoding for forming beams by assigning weights to a plurality of antennas is carried out, and in addition, power scaling for changing power distribution between the plurality of users is carried out. It should be noted that the following embodiments are provided as illustrative examples, and the present invention is not limited to these embodiments.

First Embodiment

FIG. 1 is a diagram schematically illustrating operations to be performed at the time of power scaling in multi-user MIMO according to a first embodiment of the present invention. In this embodiment, by way of example, there will be described an exemplary case where, in a cellular system for communication of mobile units such as mobile phones, signals are transmitted in a multi-user MIMO mode from a wireless base station (BS: Base Station) 11, serving as a transmitting device, to user equipment (UE: User Equipment) 12 and 13, i.e., mobile stations serving as receiving devices. In the example of FIG. 1, the first user equipment (UE-A) 12 is located in the vicinity of the wireless base station 11, and the second user equipment (UE-B) 13 is located at a position relatively distant from the wireless base station 11.

In the first embodiment, when signals are transmitted through spatial multiplexing in the multi-user MIMO mode from the wireless base station 11 to a plurality of pieces of the user equipment 12 and 13, the wireless base station 11 preliminarily provides, to one user equipment, notification of control information for the other user equipment to be spatially multiplexed. In this embodiment, there will be described a case in which the adjacent user equipment (UE-A) 12 is notified of transmission parameters as control information for the other user equipment, which are resulting from modulation system and encoding ratio (MCS: Modulation and Coding Scheme) for the user equipment (UE-B) 13 located at a distant position. Further, in the user equipment 12, a CQI indicative of a reception quality after cancellation of a transmission signal, destined for the other user equipment 13 and serving as an interference signal, is calculated based on the received control information, and an interference signal cancellation capability (cancellation function, presence or absence of a cancellation process circuit, etc.) and the calculated CQI are fed back to the wireless base station 11.

Upon reception of this feedback, the wireless base station 11 sets a transmission parameter (MCS) of each piece of the user equipment 12 and 13 using the CQI after the cancellation, performs power distribution between users by power scaling, and spatially-multiplexes and transmits signals intended for the respective users. In this case, the wireless base station 11 performs precoding for forming beams by assigning weights to a plurality of antennas, and outputs a predetermined beam to each piece of the user equipment 12 and 13.

Due to the above-described operations, the MCS for each piece of the user equipment is set using the CQI after the interference signal cancellation; therefore, even if the interference signal is high and the CQI is low, for example, a high level modulation system (e.g., 16 QAM) can be used as the MCS as long as the removal of the interference signal is enabled, thus preventing a reduction in transmission rate. For example, even if an interference signal for a transmission signal destined for the other equipment is high, data can be transmitted at a high transmission rate as long as the removal of the interference signal is enabled by having knowledge of the MCS (such as QPSK) of the relevant other equipment in advance. An interference signal in a low level modulation system such as QPSK is relatively easily removed, and if the interference signal is known in advance, the higher the signal level, the easier the removal becomes. Accordingly, even if an interference signal resulting from a transmission signal or the like destined for the other equipment is high in the user equipment in the vicinity of the wireless base station, from which power is distributed to a signal intended for the user equipment distant from the wireless base station by power scaling and through which power for a transmission signal destined for the own equipment is reduced, a reduction in transmission rate can be suppressed.

Next, specific exemplary configurations of receiving and transmitting devices in a wireless communication system according to the first embodiment will be described.

Figure 2:
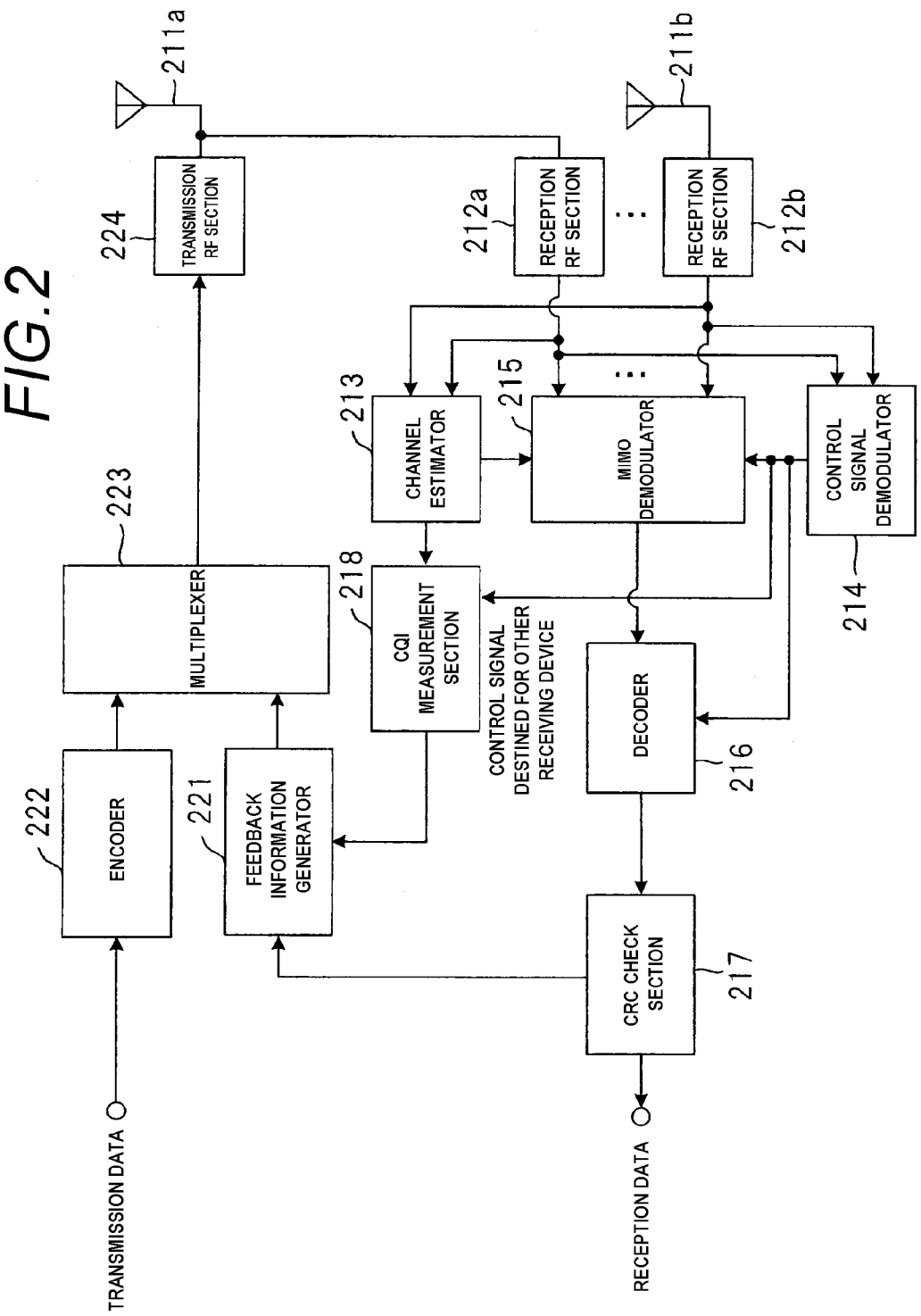
FIG. 2 is a block diagram illustrating the configuration of principal components of a receiving device used in the first embodiment of the present invention.
Figure 3:
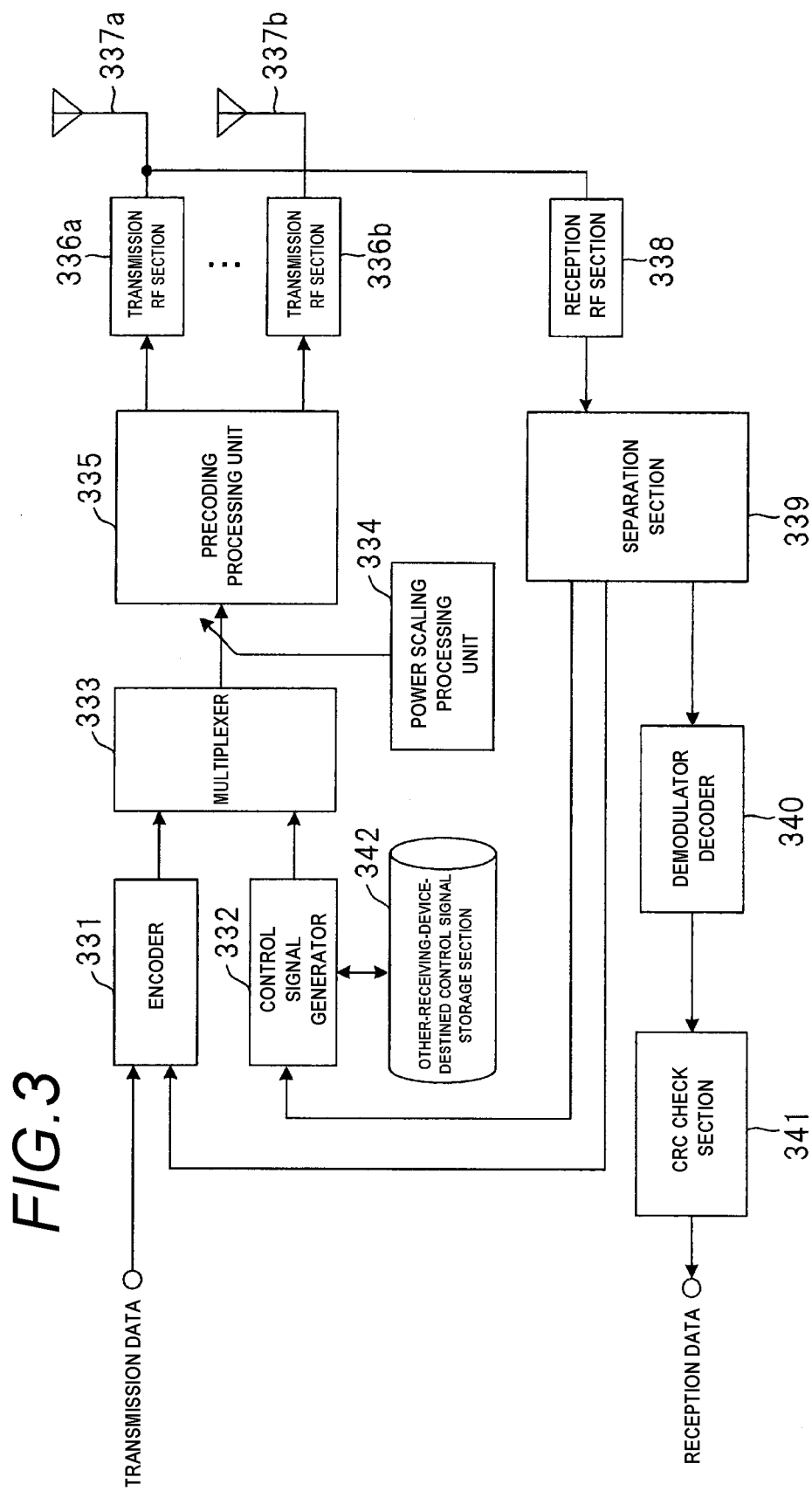
FIG. 3 is a block diagram illustrating the configuration of principal components of a transmitting device used in the first embodiment of the present invention.

FIG. 2 is a block diagram illustrating the configuration of principal components of a receiving device used in the first embodiment of the present invention, and FIG. 3 is a block diagram illustrating the configuration of principal components of a transmitting device used in the first embodiment of the present invention.

The present embodiment is provided on the assumption that wireless communication will be performed using radio waves between the receiving device illustrated in FIG. 2 and the transmitting device illustrated in FIG. 3. For example, it is assumed that the transmitting device illustrated in FIG. 3 is applied to a wireless communication base station apparatus (i.e., a wireless base station, BS) in a cellular system for providing communication service including communication of mobile units such as mobile phones, and the receiving device illustrated in FIG. 2 is applied to user equipment (UE) serving as a wireless communication mobile station apparatus such as a mobile phone apparatus. Furthermore, this embodiment is based on the premise that there is formed a MIMO system for performing wireless reception and transmission using a plurality of antennas for both of reception and transmission. It should be noted that a case in which communication is performed by a multicarrier communication method using an OFDM (Orthogonal Frequency Division Multiplexing) signal and transmission is performed sequentially on a packet-by-packet basis, for example, is conceivable as the form of a communication signal.

The receiving device illustrated in FIG. 2 includes: a plurality of antennas 211a and 211b; a plurality of reception RF sections 212a and 212b; a channel estimator 213; a control signal demodulator 214; a MIMO demodulator 215; a decoder 216; a CRC check section 217; a CQI measurement section 218; a feedback information generator 221; an encoder 222; a multiplexer 223; and a transmission RF section 224.

A radio wave transmitted from a counterpart (e.g., the transmitting device illustrating in FIG. 3) is received by each of the plurality of independent antennas 211a and 211b. A high frequency signal of the radio wave received by the antenna 211a is converted into a signal of a relatively low frequency band such as a base band signal by the reception RF section 212a, and is then subjected to processing such as Fourier transformation and/or parallel-serial conversion so as to be converted into a serial data reception signal. Similarly, a high frequency signal of the radio wave received by the antenna 211b is converted into a signal of a relatively low frequency band such as a base band signal by the reception RF section 212b, and is then subjected to processing such as Fourier transformation and/or parallel-serial conversion so as to be converted into a serial data reception signal. Outputs from these reception RF sections 212a and 212b are inputted to the channel estimator 213, the control signal demodulator 214, and the MIMO demodulator 215.

The channel estimator 213 carries out channel estimation based on a pilot channel included in a signal transmitted from each transmission antenna of the counterpart (transmitting device), thereby calculating a channel estimation value. The calculated channel estimation value is inputted to the MIMO demodulator 215 and the CQI measurement section 218. The control signal demodulator 214 demodulates a control signal transmitted together with the pilot channel, and extracts transmission parameters including MCS information such as modulation system and encoding ratio of a transmitted signal, a beam number indicative of a beam pattern of the transmitted signal, etc. The demodulated control signal is inputted to the MIMO demodulator 215, the decoder 216 and the CQI measurement section 218. In this case, the control signal including transmission parameters such as MCS destined for the own device and the other receiving device is inputted to the MIMO demodulator 215 and the CQI measurement section 218.

The MIMO demodulator 215 performs a demodulation process on a reception signal associated with the own device (its receiving device) using the channel estimation value received from the channel estimator 213. Furthermore, the MIMO demodulator 215 performs a de-interleave process, a rate de-matching process for providing modulation multi-valued number and encoding ratio corresponding to those of the transmission side, a likelihood combining process for combining the likelihood information of a past reception signal with that of the current reception signal, etc. In this case, the MIMO demodulator 215 receives, from the control signal demodulator 214, the transmission parameters (MCS) destined for the own device and the other receiving device, performs, on the reception signal received from each of the reception RF sections 212a and 212b, a cancellation process for removing a signal destined for the other receiving device, and outputs the resulting signals to the decoder 216. It should be noted that a specific example of the cancellation process for removing a signal destined for the other receiving device will be described later.

The decoder 216 restores reception data by performing a decoding process on the reception signal inputted from the MIMO demodulator 215. In this case, an error correction decoding process is performed on the signal that have been subjected to MIMO separation and received from the MIMO demodulator 215, and the resulting signal is outputted to the CRC check section 217. The CRC check section 217 performs, using a CRC (Cyclic Redundancy Check) check, an error detection process on the decoded signal outputted from the decoder 216, and outputs information on presence or absence of a data error, indicative of whether or not an error is included in the decoded reception data, to the feedback information generator 221. Then, the reception data is outputted from the CRC check section 217.

The CQI measurement section 218 receives the transmission parameter (MCS) of the other-receiving-device-destined signal from the control signal demodulator 214, calculates, using the channel estimation value outputted from the channel estimator 213, a CQI serving as a reception quality obtained when the other-receiving-device-destined signal is cancelled, and outputs the CQI to the feedback information generator 221. It should be noted that a specific example of calculation of the reception quality obtained when the other-receiving-device-destined signal is cancelled will be described later.

Based on an error detection result obtained by the CRC check section 217, the feedback information generator 221 judges whether or not an error is included in the decoded reception data, and generates Ack/Nack information. In this embodiment, ACK (Acknowledgement) is generated when no error is included in the decoded result, and Nack (Not Acknowledgement) is generated when an error is included in the decoded result. Then, the feedback information generator 221 outputs, to the multiplexer 223, feedback information that includes: the Ack/Nack information; CQI information after cancellation of the other-receiving-device-destined signal, which has been received from the CQI measurement section 218; and cancellation capability information indicating that the receiving device has the capability of canceling an interference signal.

The encoder 222 performs an encoding process on transmission data and outputs the resulting data to the multiplexer 223. The multiplexer 223 performs a multiplexing process on feedback information inputted thereto, a transmission signal including the encoded transmission data, etc. Furthermore, the multiplexer 223 performs a rate matching process, an interleave process, a modulation process and the like for setting a modulation multi-valued number and an encoding ratio adaptively, and outputs the result to the transmission RF section 224. In the transmission RF section 224, after processing such as serial-parallel conversion and/or inverse Fourier transformation has been performed, the resulting signal is converted into a high frequency signal of a predetermined wireless frequency band, subjected to power amplification, and then transmitted as a radio wave from the antenna 211a. At this time, the feedback information such as CQI information and Ack/Nack information transmitted from the receiving device is transmitted as a feedback signal to the transmitting device.

In the above-described configuration, the control signal demodulator 214 and the CQI measurement section 218 implement functions of a reception quality calculator. Further, the feedback information generator 221, the multiplexer 223 and the transmission RF section 224 implement functions of a feedback information transmission section and a cancellation capability notification section. Furthermore, the channel estimator 213 and the MIMO demodulator 215 implement functions of a demodulator.

On the other hand, the transmitting device illustrated in FIG. 3 includes: an encoder 331; a control signal generator 332; a multiplexer 333; a power scaling processing unit 334; a precoding processing unit 335; a plurality of transmission RF sections 336a and 336b; a plurality of antennas 337a and 337b; a reception RF section 338; a separation section 339; a demodulation/decoder 340; a CRC check section 341; and an other-receiving-device-destined control signal storage section 342.

A radio wave transmitted from a counterpart (e.g., the receiving device illustrating in FIG. 2) is received by the antenna 337a. A high frequency signal of the radio wave received by the antenna 337a is converted into a signal of a relatively low frequency band such as a base band signal by the reception RF section 338, and is then inputted to the separation section 339. The separation section 339 separates the feedback signal from a reception signal, and extracts and outputs the CQI information, Ack/Nack information, etc. included in the feedback signal. These pieces of CQI information and Ack/Nack information are inputted to the encoder 331 and the control signal generator 332.

The demodulation/decoder 340 performs a demodulation process and a decoding process on the reception signal separated by the separation section 339, thereby restoring received data. The CRC check section 341 performs, using a CRC check, an error detection process on the decoded signal outputted from the demodulation/decoder 340, and determines whether or not an error is included in the decoded reception data. Then, the reception data is outputted from the CRC check section 341.

The encoder 331 performs an encoding process on transmission data and outputs the resulting data to the multiplexer 333. The other-receiving-device-destined control signal storage section 342 stores, as control information, a control signal including a transmission parameter such as MCS received in advance from a control signal generator associated with a predetermined other receiving device, and outputs the control signal to the control signal generator 332 in accordance with a reception signal from the receiving device on which attention is focused. The control signal generator 332 generates a control signal including: an other-receiving-device-destined transmission parameter (MCS) received from the other-receiving-device-destined control signal storage section 342; and a beam number indicative of a beam pattern of a transmission signal, and outputs the control signal to the multiplexer 333 together with a transmission parameter (MCS) destined for the receiving device associated with the reception signal on which attention is focused.

The multiplexer 333 performs a multiplexing process on the transmission signal including the encoded transmission data, the control signal including the transmission parameter and beam number, etc. Furthermore, the multiplexer 333 performs a rate matching process, an interleave process, a modulation process and the like for setting a modulation multi-valued number and an encoding ratio adaptively, and outputs the result to the precoding processing unit 335. At this time, the power scaling processing unit 334 makes reference to the transmission parameter destined for each receiving device, and results of scheduling for setting power distribution, for example, and corrects power of the signal, outputted from the multiplexer 333, based on a power setting value set so as to be destined for the relevant receiving device.

The precoding processing unit 335 receives the power-corrected signal, and performs a precoding process thereon using the set beam number. At this time, respective transmission signals outputted to the plurality of antennas are separated and generated, a weighting process for forming a beam corresponding to the designated beam number is performed, and the respective transmission signals are outputted to the transmission RF sections 336a and 336b of the respective antennas.

In the transmission RF sections 336a and 336b, after processing such as serial-parallel conversion and/or inverse Fourier transformation has been performed on the transmission signals, the resulting signals are converted into high frequency signals of predetermined wireless frequency bands, subjected to power amplification, and then transmitted as radio waves from the antennas 337a and 337b. The transmission signals from the transmitting device are transmitted to the receiving device as pilot channels, control signals, and data signals including various pieces of data, for example. In this embodiment, the pilot channel and control signal are transmitted as omnidirectional signals by which no beam is formed, and the data signal is transmitted as a directional signal by which a predetermined beam is formed in accordance with the beam number by precoding through a predetermined transmission channel.

In the above-described configuration, the other-receiving-device-destined control signal storage section 342 implements functions of a control information retaining section. Further, the control signal generator 332, the multiplexer 333 and the transmission RF sections 336a and 336b implement functions of a control information notification section. The encoder 331, the multiplexer 333, the power scaling processing unit 334, the precoding processing unit 335, and the transmission RF sections 336a and 336b implement functions of a signal transmission section.

Figure 4:
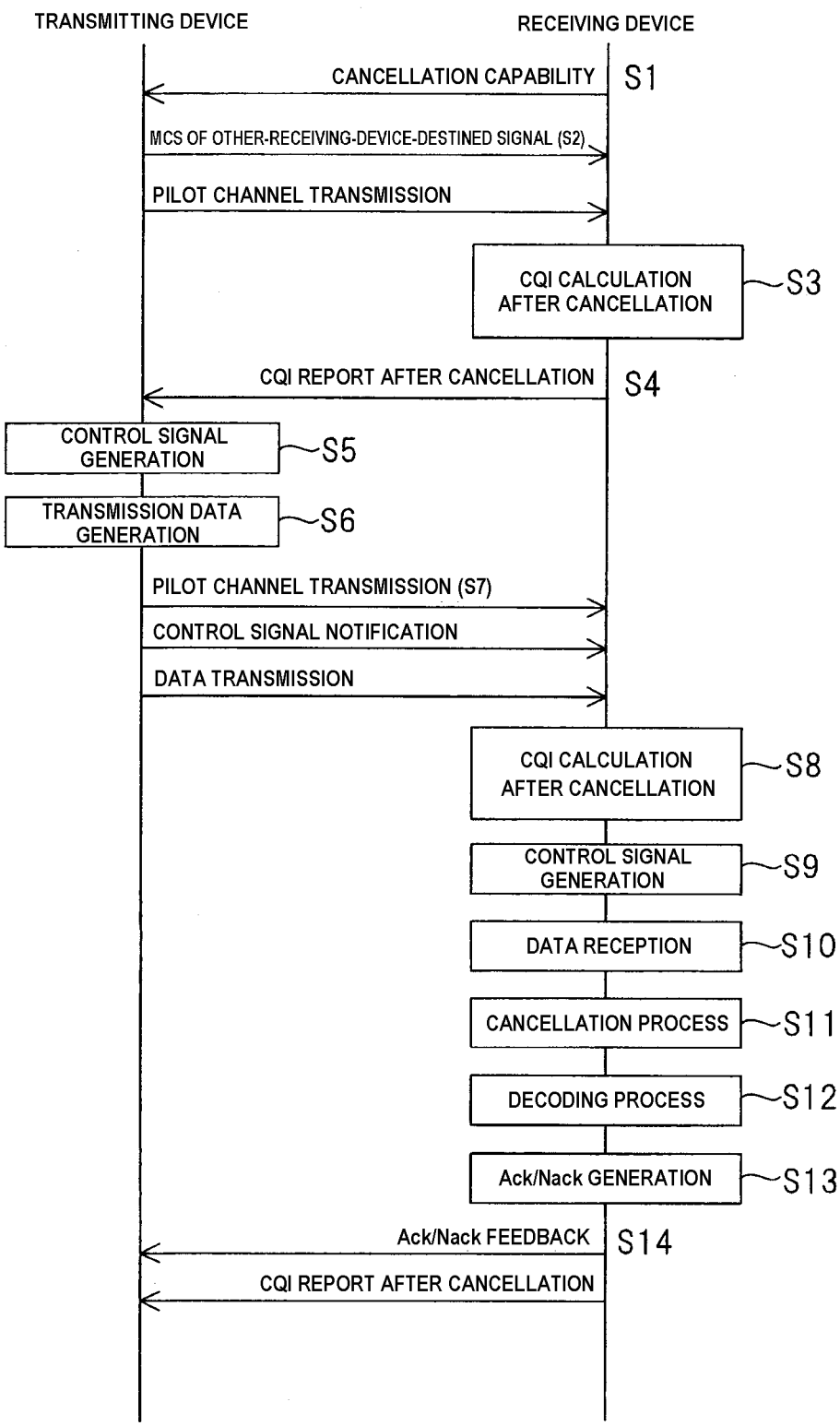
FIG. 4 is a sequence chart illustrating a specific example of procedure of overall processing concerning communication between the transmitting device and the receiving device according to the first embodiment.

Next, a processing procedure when communication is performed between the receiving device illustrated in FIG. 2 and the transmitting device illustrated in FIG. 3 in the present embodiment will be described below with reference to FIG. 4. FIG. 4 is a sequence chart illustrating a specific example of procedure of overall processing concerning communication between the transmitting device and receiving device according to the first embodiment.

Step S1: Using feedback information generated by the feedback information generator 221, the receiving device notifies the transmitting device that the receiving device has a cancellation capability due to its function of canceling an interference signal, for example. Notification of information on the cancellation capability is provided using data indicative of presence or absence of a cancellation function, presence or absence of a cancellation process circuit, etc. in the form of a binary value, i.e., 0 or 1, or in the form of multiple values, for example.

Step S2: The transmitting device generates, in the control signal generator 332, a control signal including a transmission parameter (MCS such as a modulation system and/or an encoding ratio) of a signal destined for the other receiving device, and transmits this transmission parameter of the other-receiving-device-destined signal to the receiving device together with a pilot channel.

Step S3: The receiving device receives the transmission parameter (MCS) of the other-receiving-device-destined signal in the control signal, and with the use of the pilot channel sent together with the control signal, the receiving device calculates, in the CQI measurement section 218, a reception quality (CQI), obtained when the other-receiving-device-destined signal is cancelled, from the reception quality of this pilot channel and the transmission parameter (MCS) of the other-receiving-device-destined signal. In this case, channel estimation of a propagation path is performed by the channel estimator 213 using the pilot channel, and the CQI obtained when the other-receiving-device-destined signal is cancelled is calculated based on this channel estimation value and the MCS of the other-receiving-device-destined signal.

Step S4: The receiving device generates, in the feedback information generator 221, feedback information including the calculated CQI after the cancellation of the other-receiving-device-destined signal, and reports the information as feedback to the transmitting device.

Step S5: The transmitting device sets, in the control signal generator 332, a transmission parameter (MCS such as a modulation system and/or an encoding ratio) intended for the relevant receiving device based on the CQI fed back from the receiving device, and generates a control signal including: a transmission parameter (MCS) intended for the other receiving device to be multiplexed with the transmission parameter (MCS) intended for the relevant receiving device; and a beam number intended for the relevant receiving device. In this embodiment, in addition to the MCS, the control signal may include information indicating with which user equipment (receiving device) multiplexing is performed in multi-user MIMO, i.e., information of the receiving device with which multiplexing is performed.

Step S6: The transmitting device performs processing in the encoder 331 and the multiplexer 333 based on the transmission parameter set in Step S5, thereby generating transmission data intended for the relevant receiving device.

Step S7: The transmitting device transmits each of the pilot channel, control signal and data signal to the receiving device. In this case, the transmission data is transmitted after its power is corrected in accordance with a power setting value on which power scaling is carried out between the receiving devices by the power scaling processing unit 334.

Step S8: Similarly to Step S3, the receiving device calculates, by the CQI measurement section 218, a CQI obtained when the other-receiving-device-destined signal is cancelled.

Step S9: The receiving device demodulates the control signal from a reception signal in the control signal demodulator 214, thereby deriving the transmission parameter (MCS).

Steps S10, S11 and S12: While receiving data in the MIMO demodulator 215, the receiving device performs a cancellation process on the other-receiving-device-destined signal to carry out demodulation, and then performs a decoding process in the decoder 216. In this embodiment, at the time of demodulation in the MIMO demodulator 215, a signal destined for the other device is cancelled while a data symbol destined for the own device is derived from the signal, multiplexed by multi-user MIMO, using the channel estimation value and/or the transmission parameters destined for the own device and other apparatus.

Step S13: The receiving device performs an error detection process on the decoded reception data in the CRC check section 217, and generates Ack/Nack information responsive to the decoded result in the feedback information generator 221.

Step S14: The receiving device generates feedback information including the Ack/Nack information and CQI after cancellation of the other-receiving-device-destined signal in the feedback information generator 221, and reports these pieces of information as feedback to the transmitting device.

Hereinafter, an operation for calculating a CQI as a reception quality in Steps S3 and S8, which is one of characteristic operations in the receiving device of the present embodiment, will be described in detail. The CQI measurement section 218 receives the transmission parameter (MCS) of the other-receiving-device-destined signal demodulated by the control signal demodulator 214, and calculates, using the channel estimation value outputted by the channel estimator 213, the CQI obtained when the other-receiving-device-destined signal is cancelled.

As a specific example of a CQI calculation method, there will be described a process performed when it is assumed that the other-receiving-device-destined signal allocated to a transmission antenna i (i represents any integer associated with the antenna) is completely removable. A channel matrix, in which a row vector $H_i$ including a channel estimation value for the transmission antenna i is deleted from a channel matrix H outputted by the channel estimator 213, is defined as $H\sim(i)$ ("H~" represents H on which ~ is added). In this case, a reception quality $SINR_j$, obtained on the assumption that MMSE reception is performed when the other-receiving-device-destined signal allocated to the transmission antenna i is cancelled and then the own-device-destined signal allocated to a transmission antenna j is derived, may be represented by the following equation. The CQI indicative of the reception quality after cancellation of the other-receiving-device-destined signal is calculated based on this equation.

$$SINR_j \cong \frac{|W_j^T \tilde{H}(i)_j|}{1 - |W_j^T \tilde{H}(i)_j|}, \quad W = [W_1 \ldots W_J], \quad [\text{Eq. 1}]$$

$$W = \left(\tilde{H}(i)^* \tilde{H}(i)^T + \sigma^2 I_J\right)^{-1} \tilde{H}(i)^*$$

(where W represents an MMSE reception weight, $\tilde{H}(i)$ represents a channel matrix in which a row vector $H_i$ is deleted from a channel matrix H, T represents a transposition matrix, and * represents a complex conjugate)

Moreover, an operation for a cancellation process on the other-receiving-device-destined signal in Step S11, which is one of characteristic operations in the receiving device of the present embodiment, will be described in detail. The MIMO demodulator 215 receives the transmission parameters (MCS), destined for the own device and destined for the other receiving device, from the control signal demodulator 214, and performs a cancellation process on the reception signal to remove the other-receiving-device-destined signal therefrom. A specific example of this cancellation process will be described below.

(1) The receiving device on which attention is focused derives an other-receiving-device-destined control signal, and decodes, using the transmission parameter (MCS) obtained from this control signal, the signal (signal serving as an interference signal) of the transmission antenna i allocated to the relevant signal.

(2) The signal obtained in the procedural step (1) is re-encoded and multiplied by the associated channel estimation value to generate a reception signal replica, and the reception signal replica is subtracted from the reception signal.

(3) For the signal obtained in the procedural step (2), an MMSE reception weight obtained similarly to Step S3 is used, and a own-device-destined signal is derived.

It should be noted that although an example in which no process is performed on a channel matrix in the procedural step (1) has been described in the foregoing processing example, the present invention is not limited to this example; alternatively, prior to the procedural step (1), a channel matrix may be rearranged in accordance with power received for each transmission antenna, and signals may be cancelled in descending order of the received power. Furthermore, although an example in which a reception signal replica is generated by re-encoding the decoded other-receiving-device-destined signal has been described in the foregoing processing example, the present invention is not limited to this example; alternatively, a process for generating a reception signal replica using a soft decision value after MMSE reception of the relevant signal may be performed.

Next, detailed description will be made on the generation of the control signal for the other-receiving-device-destined signal in Step S2, the setting of the transmission parameter intended for the relevant receiving device in Step S5, and the control concerning the power scaling process in Step S7, each of which is one of characteristic operations in the transmitting device of the present embodiment. Hereinafter, a specific example of the control concerning each of the above-mentioned processes will be described assuming that two users, i.e., a receiving device A and a receiving device B, are taken into consideration.

The other-receiving-device-destined control signal storage section 342 stores a control signal including a transmission parameter (MCS) received in advance from the control signal generator associated with a predetermined other receiving device. Then, the other-receiving-device-destined control signal is outputted to the control signal generator 332 in accordance with a reception signal from the receiving device on which attention is focused.

First, in Step S2, the transmitting device receives a report on a CQI from the receiving device A, and the following information is supposed to be reported: a modulation system is QPSK, and encoding ratio R=1/4. The other-receiving-device-destined control signal storage section 342 of the transmitting device stores a set of: an ID associated with this receiving device A; and a control signal including these pieces of CQI information.

Subsequently, when the transmitting device carries out control intended for the receiving device B, the control signal destined for the receiving device A, which has previously been stored, is outputted to the control signal generator 332. Thus, the control signal for the other-receiving-device-destined signal is generated in the control signal generator 332.

Then, in Step S5, the transmission parameter (MCS) intended for each receiving device is set in the transmitting device based on the CQIs fed back from the receiving device A and receiving device B. In this embodiment, the reported values of the CQIs are supposed to be as follows: a modulation system is QPSK and encoding ratio R=1/4 for the receiving device A, while a modulation system is 16 QAM and encoding ratio R=3/4 for the receiving device B.

Further, the transmitting device receives a notification that there is a cancellation capability from the receiving device B in Step S1, and the receiving device A and the receiving device B are supposed to be selected as users to be multiplexed while being subjected to power scaling.

The transmitting device applies power scaling to the receiving device A and the receiving device B, and transmission power destined for the receiving device A is set at +3 dB while transmission power destined for the receiving device B is set at −3 dB. With this power correction, the MCS destined for the receiving device A is higher than the reported value, and is as follows: the modulation system is QPSK and encoding ratio R=1/2; on the other hand, the MCS destined for the receiving device B is lower than the reported value, and is as follows: the modulation system is 16 QAM and encoding ratio R=3/8.

It should be noted that in the method of the present embodiment, it is only necessary to consider only correction values for desired signal power S set by the transmitting device; however, in a conventional method, the influence of an interference component (which is the interference with the receiving device B caused by the receiving device A in this case) cannot be ignored, and therefore, the operations described in this embodiment cannot sufficiently cope with the interference.

Furthermore, in Step S7, power scaling is performed between the receiving devices by the power scaling processing unit 334. At this time, in accordance with the power correction values decided by the transmitting device, the power scaling processing unit 334 corrects the power for the signals, outputted from the multiplexer 333, so that the transmission power destined for the receiving device A is +3 dB and the transmission power destined for the receiving device B is −3 dB, and passes the corrected result to the precoding processing unit 335.

As described above, according to the first embodiment, among the user equipment serving as the receiving device, the user equipment located in the vicinity of the base station and having a cancellation capability notifies, in advance, the wireless base station serving as the transmitting device about information on the cancellation capability, and the wireless base station notifies the user equipment of control information including a transmission parameter such as MCS destined for the other user equipment to be spatially multiplexed. Based on the control information received from the wireless base station, the user equipment calculates a reception quality after cancellation of an other-user-equipment-destined signal, and feeds back the calculated result to the wireless base station. Then, the wireless base station performs spatially-multiplexed transmission to the relevant user equipment while correcting power distribution between users by power scaling. On this occasion, a beam is formed for each piece of user equipment by precoding.

In this case, if an attempt is made to ensure signal strength for the user equipment having a low reception quality by changing the power distribution between users by power scaling, the influence of interference between users, which has been reduced by the beam formed by precoding, will be increased; however, other-user-equipment-destined control information is notified in advance, thus allowing the other-user-equipment-destined signal serving as an interference signal to be cancelled easily and effectively in the user equipment. Besides, on this occasion, the setting of a transmission parameter based on a high reception quality is enabled by feeding back the reception quality after the cancellation from the user equipment, thus preventing the transmission rate from being reduced even if the interference signal is high, and making it possible to suppress a reduction in the transmission rate. Consequently, a method capable of improving transmission efficiency by appropriately selecting a user for simultaneous transmission in multi-user MIMO can be implemented with favorable characteristics.

Second Embodiment

Figure 5:
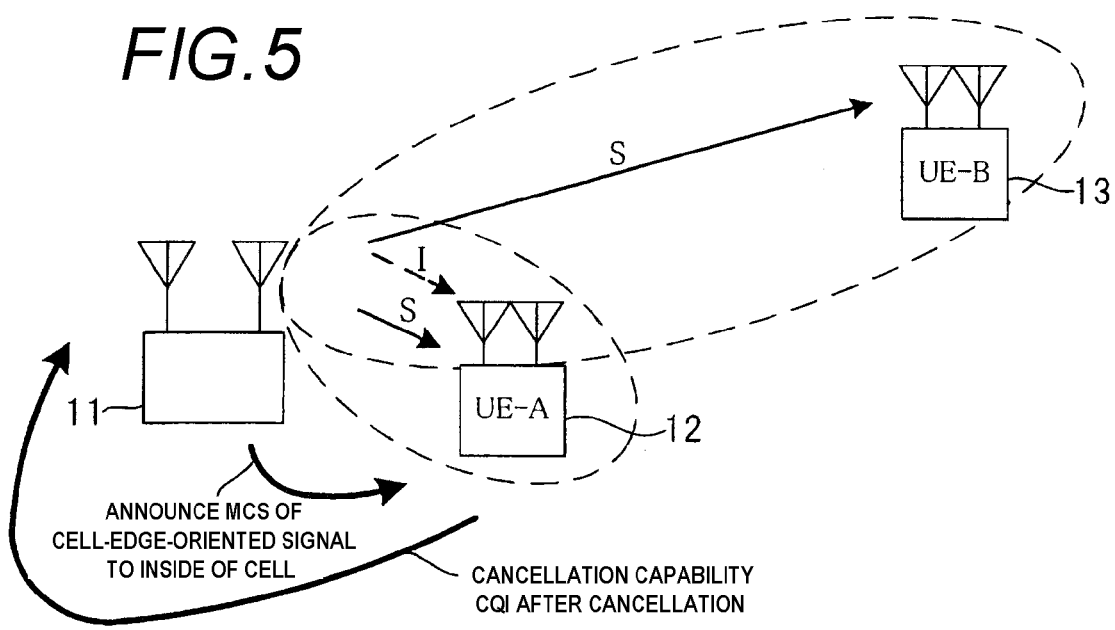
FIG. 5 is a diagram schematically illustrating operations to be performed at the time of power scaling in multi-user MIMO according to a second embodiment of the present invention.

FIG. 5 is a diagram schematically illustrating operations to be performed at the time of power scaling in multi-user MIMO according to a second embodiment of the present invention. The example of FIG. 5 illustrates a case in which, in a cellular system for communication of mobile units such as mobile phones, the first user equipment (UE-A) 12 is located in the vicinity of the wireless base station 11 within a cell, and the second user equipment (UE-B) 13 is located at a cell edge distant from the wireless base station 11.

In the second embodiment, when signals are transmitted through spatial multiplexing from the wireless base station 11 to the plurality of user equipment 12 and 13 in a multi-user MIMO mode, control information of a signal intended for the user equipment 13 at the cell edge (cell-edge-oriented signal) is announced from the wireless base station 11 to the user equipment within the cell. As the control information, a transmission parameter such as MCS is used. Further, in the user equipment 12 having a cancellation capability, a CQI indicative of a reception quality after cancellation of the cell-edge-oriented signal serving as an interference signal is calculated based on the received control information, and the capability of canceling the interference signal (e.g., presence or absence of a cancellation function) and the calculated CQI are fed back to the wireless base station 11.

Upon reception of this feedback, the wireless base station 11 sets a transmission parameter (MCS) of the relevant user equipment 12 using the CQI after the cancellation, performs power distribution between the signal intended for the relevant user equipment 12 and the cell-edge-oriented signal by power scaling, and transmits these signals through spatial multiplexing. In this case, the wireless base station 11 assigns weights to a plurality of antennas to perform precoding for forming beams, and outputs a predetermined beam to each piece of the user equipment 12 and 13.

Due to the foregoing operations, even if the interference signal resulting from the cell-edge-oriented signal is high and the CQI is reduced, for example, a high level modulation system (e.g., 16 QAM) can be used as the MCS as long as the removal of the cell-edge-oriented signal is enabled, and therefore, the transmission rate will not be reduced. Accordingly, even if the interference signal resulting from the cell-edge-oriented signal is high in the user equipment in the vicinity of the wireless base station, from which power is distributed to the cell-edge-oriented signal by power scaling and through which power for a transmission signal destined for the own equipment is reduced, a reduction in the transmission rate can be suppressed.

Next, specific exemplary configurations of a receiving device and a transmitting device in a wireless communication system according to the second embodiment will be described.

Figure 6:
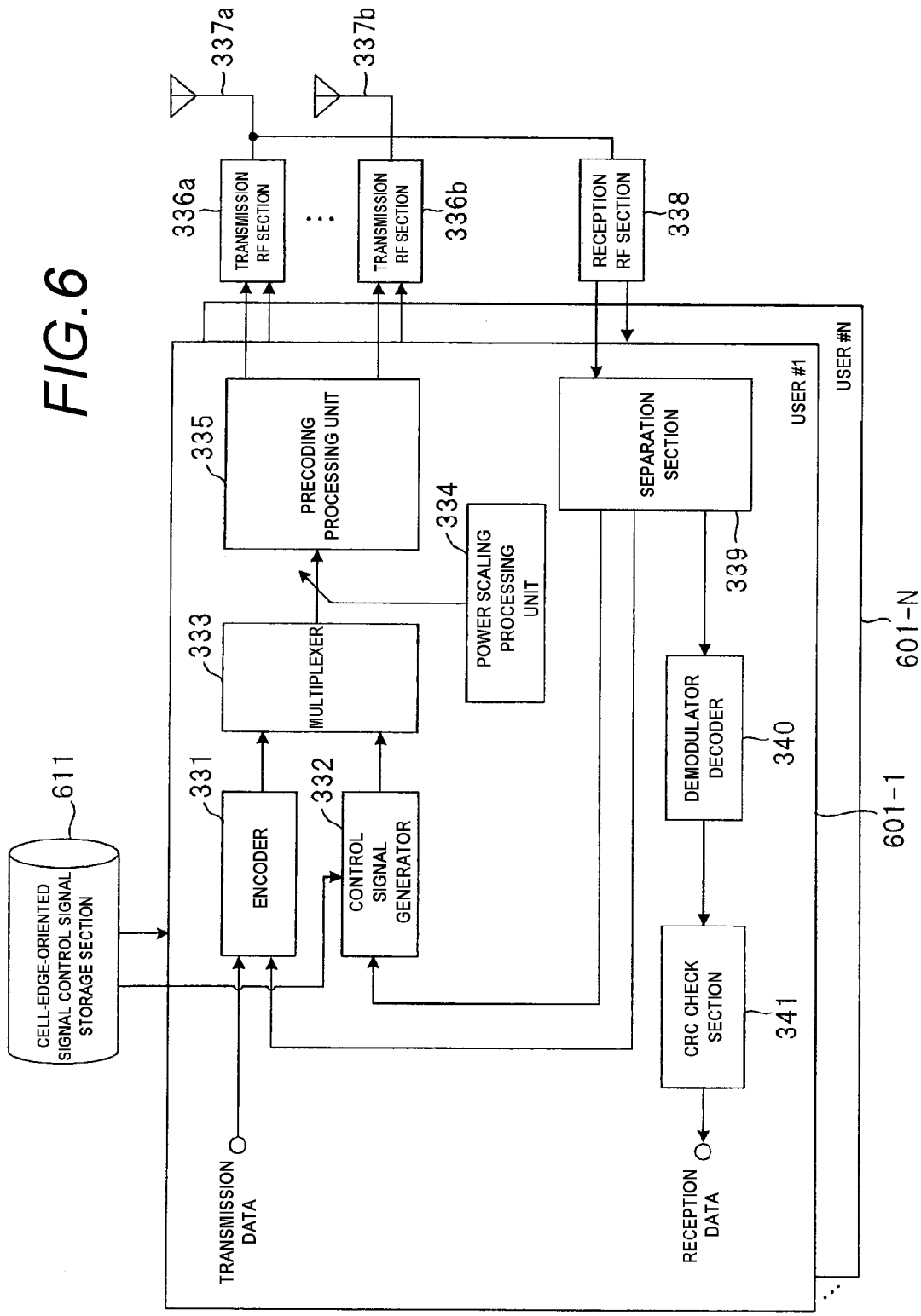
FIG. 6 is a block diagram illustrating the configuration of principal components of a transmitting device used in the second embodiment of the present invention.
Figure 7:
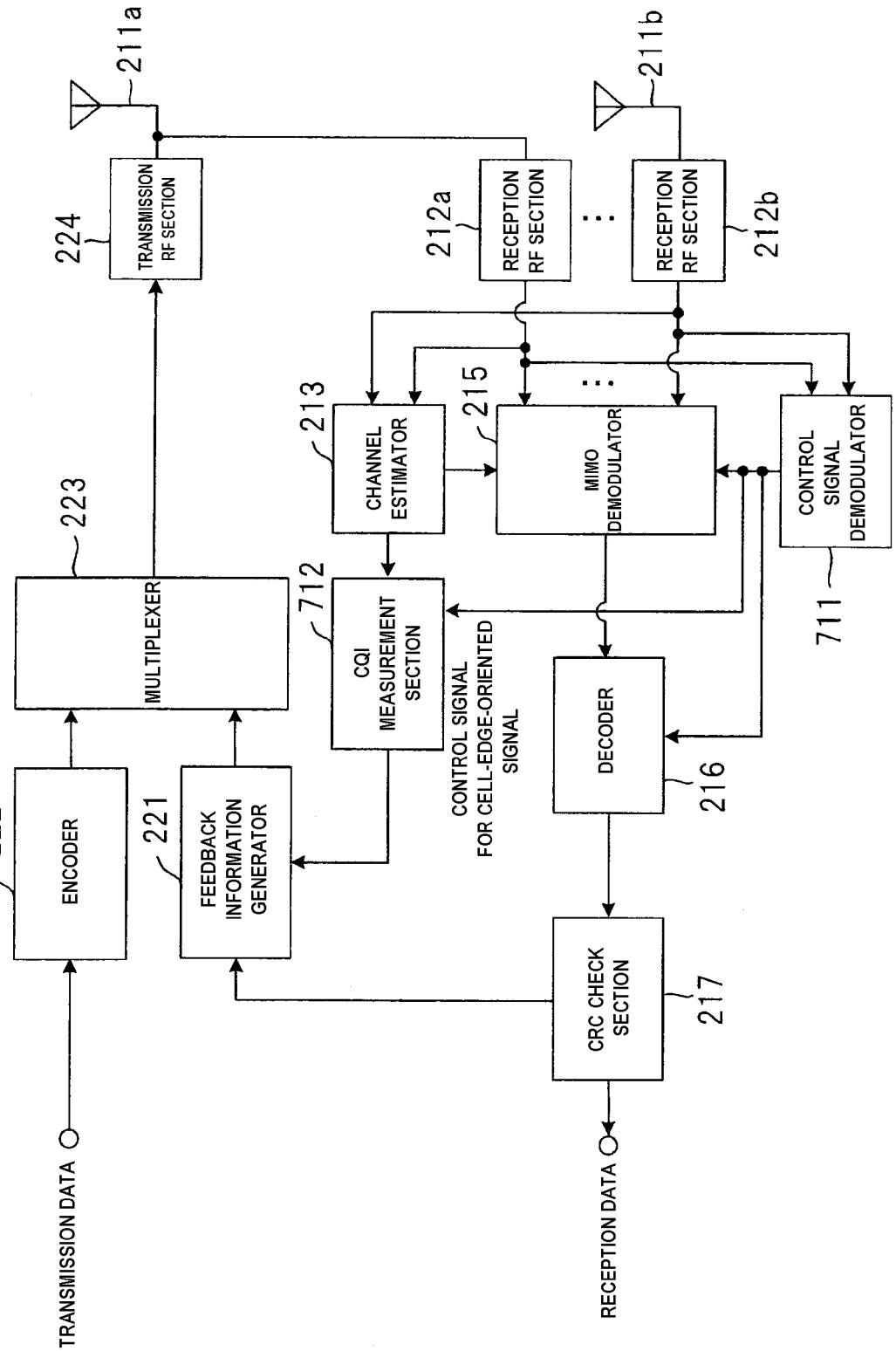
FIG. 7 is a block diagram illustrating the configuration of principal components of a receiving device used in the second embodiment of the present invention.

FIG. 6 is a block diagram illustrating the configuration of principal components of a transmitting device used in the second embodiment of the present invention, and FIG. 7 is a block diagram illustrating the configuration of principal components of a receiving device used in the second embodiment of the present invention.

The second embodiment is an example in which the first embodiment is partially modified. It should be noted that in the second embodiment, components similar to those of the first embodiment are identified by the same reference characters, and detailed description thereof will be omitted.

The transmitting device illustrated in FIG. 6 includes transmission processing units 601-1 to 601-N in association with user equipment of a plurality of users #1 to #N, each piece of which serves as a receiving device. Each of the transmission processing units 601-1 to 601-N has a configuration substantially similar to that of the transmitting device of the first embodiment illustrated in FIG. 3, ranging from the precoding processing unit 335 to the separation section 339, and these transmission processing units 601-1 to 601-N are connected to the transmission RF sections 336a and 336b and the reception RF section 338. Further, instead of the other-receiving-device-destined control signal storage section 342, a cell-edge-oriented signal control signal storage section 611 is provided.

In the above-described configuration, the cell-edge-oriented signal control signal storage section 611 implements functions of a control information retaining section.

An operation of the cell-edge-oriented signal control signal storage section 611, which is one of characteristic operations in the transmitting device of the second embodiment, will be described. The cell-edge-oriented signal control signal storage section 611 stores, as control information, a control signal including a transmission parameter such as MCS for a cell-edge-oriented signal predetermined in advance by a scheduler, and outputs this control signal to the control signal generator 332 associated with each receiving device. Based on the control signal received from the cell-edge-oriented signal control signal storage section 611, the control signal generator 332 associated with each receiving device generates a control signal including: a transmission parameter (MCS) of a cell-edge-oriented signal; and a beam number indicative of a beam pattern of a transmission signal, and outputs the control signal to the multiplexer 333 together with a transmission parameter (MCS) destined for the relevant receiving device.

In this embodiment, the cell-edge-oriented signal may be defined as being associated with an announcement channel (for example, the modulation system is QPSK and encoding ratio R=1/8) in which MCS is predetermined in advance in the system, and/or a channel (limited to QPSK, for example) in which only the modulation system is predetermined in advance in the system and which is a target for multi-user MIMO at a cell edge. Furthermore, the foregoing definition of the cell-edge-oriented signal may be notified by being delivered (broadcast) to the entire cell as system information on the announcement channel.

On the other hand, the configuration of the receiving device illustrated in FIG. 7 is different from that of the receiving device of FIG. 2 in operations of a control signal demodulator 711 and a CQI measurement section 712. The operations of the control signal demodulator 711 and the CQI measurement section 712, each of which is one of characteristic operations in the receiving device of the second embodiment, will be described. In the present embodiment, the following description is intended for a receiving device such as user equipment in the vicinity of a wireless base station, which may be multiplexed with a cell-edge-oriented signal.

The control signal demodulator 711 demodulates a control signal transmitted together with a pilot channel, and outputs the resulting signal to the MIMO demodulator 215, the decoder 216 and the CQI measurement section 712. In this case, in addition to a transmission parameter (MCS) destined for the own device, the control signal including a transmission parameter (MCS) for a cell-edge-oriented signal is inputted to the MIMO demodulator 215 and the CQI measurement section 712.

The CQI measurement section 712 receives the transmission parameter (MCS) for the cell-edge-oriented signal from the control signal demodulator 711, calculates, using a channel estimation value outputted from the channel estimator 213, a CQI as a reception quality obtained when the cell-edge-oriented signal is cancelled, and outputs the calculated result to the feedback information generator 221. A method for calculating the CQI when the cell-edge-oriented signal is cancelled is similar to the method of the first embodiment.

In the above-described configuration, the control signal demodulator 711 and the CQI measurement section 712 implement functions of a reception quality calculator.

As described above, according to the second embodiment, among the user equipment serving as the receiving device, the user equipment having a cancellation capability, which is located in the vicinity of the base station, for example, and may be multiplexed with a cell-edge-oriented signal, notifies the wireless base station serving as the transmitting device about information indicative of these facts in advance, and the wireless base station notifies the user equipment within a cell about control information including a transmission parameter such as MCS for a cell-edge-oriented signal in advance via an announcement channel or the like. Based on the control information received from the wireless base station, the user equipment calculates a reception quality obtained after cancellation of the cell-edge-oriented signal, and feeds back the calculated result to the wireless base station. Then, the wireless base station performs spatially-multiplexed transmission to the relevant user equipment while correcting power distribution between users by power scaling. On this occasion, a beam is formed for each piece of the user equipment by precoding.

In this case, if an attempt is made to ensure signal strength for the user equipment at a cell edge by changing the power distribution between users by power scaling, the influence of interference between users, which has been reduced by the beam formed by precoding, will be increased; however, control information of the cell-edge-oriented signal is notified in advance, thus allowing the cell-edge-oriented signal serving as an interference signal to be cancelled easily and effectively in the user equipment in the vicinity of the base station. Besides, on this occasion, the setting of a transmission parameter based on a high reception quality is enabled by feeding back the reception quality after the cancellation from the user equipment, thus preventing the transmission rate from being reduced even if the interference signal is high, and making it possible to suppress a reduction in the transmission rate.

Third Embodiment

Figure 8:
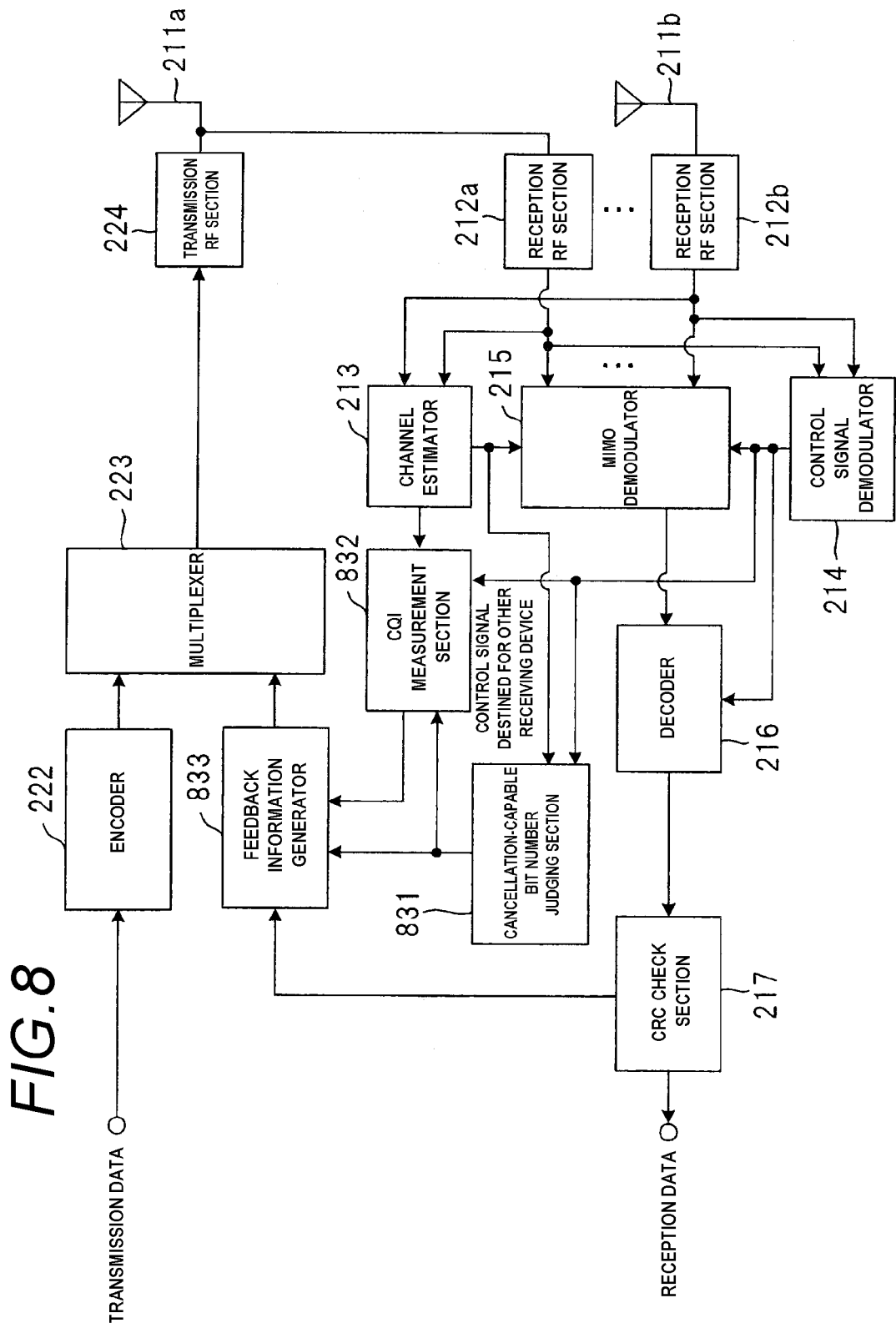
FIG. 8 is a block diagram illustrating the configuration of principal components of a receiving device in a wireless communication system according to a third embodiment of the present invention.

FIG. 8 is a block diagram illustrating the configuration of principal components of a receiving device in a wireless communication system according to a third embodiment of the present invention. It should be noted that in the third embodiment, components similar to those of the first embodiment are identified by the same reference characters, and detailed description thereof will be omitted.

In the third embodiment, when signals are transmitted through spatial multiplexing from the wireless base station to a plurality of pieces of user equipment in a multi-user MIMO mode, the user equipment (receiving device) having a cancellation capability acquires a transmission parameter (MCS) destined for the other user equipment (other-receiving-device-destined signal), and judges a level at which cancellation of the other-receiving-device-destined signal serving as an interference signal is enabled accurately in a receiving situation in which the relevant MCS is envisaged. Then, in accordance with the level at which the cancellation is enabled, a CQI indicative of a reception quality after the other-receiving-device-destined signal is cancelled is calculated with an error at or below this level taken into consideration, and the capability of canceling the interference signal (e.g., presence or absence of a cancellation function) and the calculated CQI are fed back to the wireless base station (transmitting device). Due to the foregoing operation, CQI measurement, in which MCS information destined for the other user equipment is utilized, is enabled.

The receiving device of the third embodiment illustrated in FIG. 8 includes a cancellation-capable bit number judging section 831. Moreover, operations of a CQI measurement section 832 and a feedback information generator 833 are partially different. In the present embodiment, the operations are performed on the assumption that multilevel modulation is used as a modulation system for an other-receiving-device-destined signal.

The cancellation-capable bit number judging section 831 receives, from the control signal demodulator 214, a control signal destined for the other receiving device, acquires MCS of a transmission parameter, and judges a bit number capable of canceling the other-receiving-device-destined signal in a receiving situation in which the relevant MCS is envisaged. At this time, the cancellation-capable bit number judging section 831 performs the following processing when the modulation system for the other-receiving-device-destined signal is recognized as multilevel modulation such as 16 QAM. Specifically, the cancellation-capable bit number judging section 831 estimates a receiving situation for the other-receiving-device-destined signal using a channel estimation value received from the channel estimator 213. Then, using the receiving situation estimation result, the level, at which the cancellation of the other-receiving-device-destined signal is enabled accurately when the modulation system for the other-receiving-device-destined signal is envisaged, is judged to be able to cancel all bits or to be able to cancel only two higher-order bits, for example. In the case of 16 QAM, the level is judged to be able to cancel all four bits (16 symbols) or two higher-order bits (4 symbols), for example, and in the case of 64 QAM, the level is judged to be able to cancel all six bits (64 symbols), four higher-order bits (16 symbols) or two higher-order bits (4 symbols), for example. Thereafter, the judged result is outputted as a cancellation-capable bit number to the CQI measurement section 832 and the feedback information generator 833.

Using the received cancellation-capable bit number, the CQI measurement section 832 measures a CQI as a reception quality obtained when a modulation symbol associated with the relevant bit number of the other-receiving-device-destined signal is cancelled, and outputs the CQI measurement result to the feedback information generator 833. The feedback information generator 833 generates feedback information including: the cancellation-capable bit number received from the cancellation-capable bit number judging section 831; and CQI information after the cancellation of the other-receiving-device-destined signal, which has been received from the CQI measurement section 832, and outputs the feedback information to the multiplexer 223. In this embodiment, the feedback information generator 833 may output the cancellation-capable bit number and the CQI measurement result at different timings.

Based on the cancellation-capable bit number and the CQI measurement result after the cancellation of the other-receiving-device-destined signal, which are included in the feedback information notified from the receiving device, the transmitting device adaptively sets a transmission parameter such as MCS destined for the relevant receiving device, and transmits transmission signals destined for a plurality of receiving devices through spatial multiplexing.

As described above, according to the third embodiment, when multilevel modulation is used as the modulation system for the other-receiving-device-destined signal, the user equipment serving as the receiving device judges the level, at which the cancellation of the other-receiving-device-destined signal serving as an interference signal is enabled accurately, by utilizing MCS information destined for the other receiving device, and enables the measurement of the CQI after the cancellation. Thus, based on the CQI measurement result after the interference signal cancellation, the base station apparatus serving as the transmitting device is capable of suitably setting a transmission parameter such as MCS destined for each piece of the user equipment, and also capable of appropriately performing power scaling between a plurality of pieces of the user equipment. It should be noted that although examples in which 16 QAM and 64 QAM are used have been described in this embodiment, Gray-coded multilevel modulation systems such as multilevel QAM modulation including 256 QAM and 1024 QAM, and multilevel PSK modulation including 8 PSK and 16 PSK may be used.

Fourth Embodiment

Figure 9:
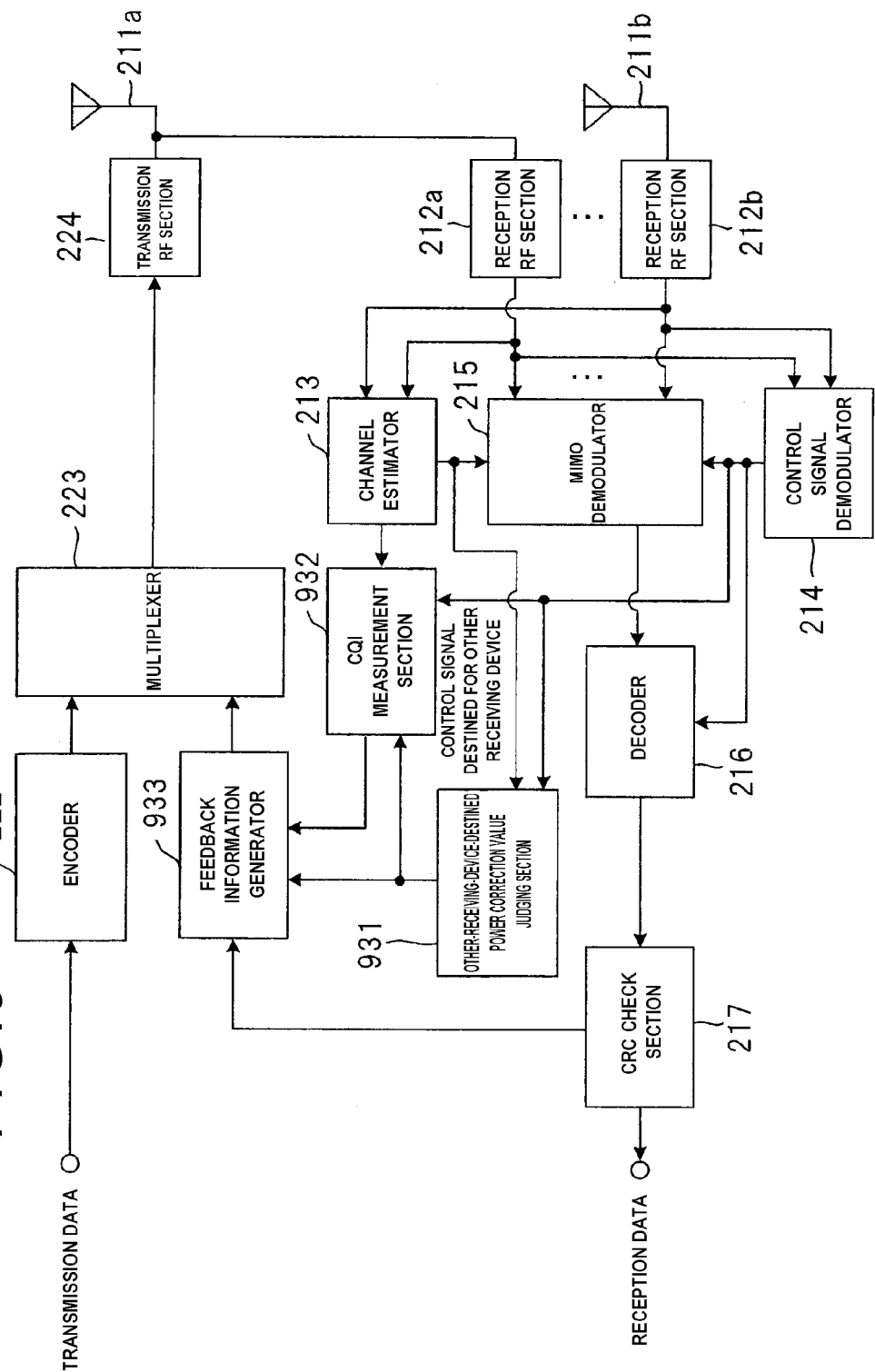
FIG. 9 is a block diagram illustrating the configuration of principal components of a receiving device in a wireless communication system according to a fourth embodiment of the present invention.
Figure 10:
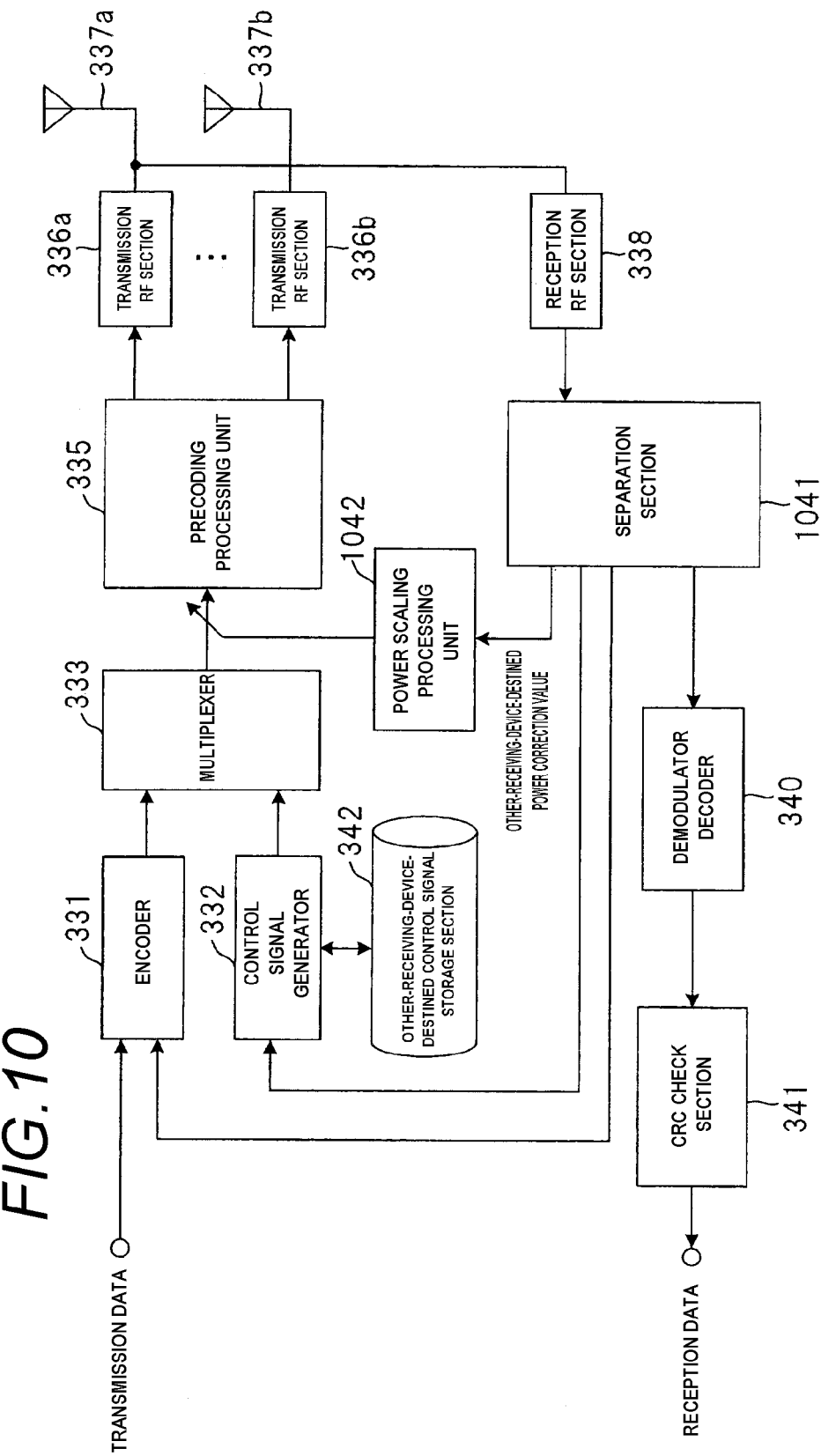
FIG. 10 is a block diagram illustrating the configuration of principal components of a transmitting device in the wireless communication system according to the fourth embodiment of the present invention.

FIG. 9 is a block diagram illustrating the configuration of principal components of a receiving device in a wireless communication system according to a fourth embodiment of the present invention, and FIG. 10 is a block diagram illustrating the configuration of principal components of a transmitting device in the wireless communication system according to the fourth embodiment of the present invention. It should be noted that in the fourth embodiment, components similar to those of the first embodiment are identified by the same reference characters, and detailed description thereof will be omitted.

In the fourth embodiment, when signals are transmitted through spatial multiplexing from the wireless base station to a plurality of pieces of user equipment in a multi-user MIMO mode, the user equipment (receiving device) having a cancellation capability acquires a transmission parameter (MCS) destined for the other user equipment (other-receiving-device-destined signal), and judges an other-user-equipment-destined power correction value capable of accurately canceling the other-receiving-device-destined signal serving as an interference signal in a receiving situation in which the relevant MCS is envisaged. Then, in accordance with the judged power correction value, a CQI indicative of a reception quality after the other-receiving-device-destined signal is cancelled is calculated with this power correction value taken into consideration, and the capability of canceling the interference signal (e.g., presence or absence of a cancellation function) and the calculated CQI are fed back to the wireless base station (transmitting device). Due to the foregoing operation, power scaling control, in which MCS information destined for the other user equipment is utilized, is enabled.

The receiving device of the fourth embodiment illustrated in FIG. 9 includes an other-receiving-device-destined power correction value judging section 931. Moreover, operations of a CQI measurement section 932 and a feedback information generator 933 are partially different.

The other-receiving-device-destined power correction value judging section 931 receives, from the control signal demodulator 214, a control signal destined for the other receiving device, acquires MCS of a transmission parameter, and judges a power correction value capable of canceling the other-receiving-device-destined signal in a receiving situation in which the relevant MCS is envisaged. At this time, the other-receiving-device-destined power correction value judging section 931 reads the modulation system for the other-receiving-device-destined signal, and estimates a receiving situation for the other-receiving-device-destined signal using a channel estimation value received from the channel estimator 213. Then, using the receiving situation estimation result, the power correction value capable of accurately canceling the other-receiving-device-destined signal when the modulation system for the other-receiving-device-destined signal is envisaged, is judged. For example, it is judged that the cancellation is enabled when the power is increased by 3 dB, and the cancellation is also enabled when the power is reduced by 2 dB. Thereafter, the judged result is outputted as an other-receiving-device-destined power correction value to the CQI measurement section 932 and the feedback information generator 933. In this case, if the interference signal is known in advance, the higher the signal level, the easier the removal; therefore, a power correction value by which the other-receiving-device-destined signal reaches a predetermined level or higher will be set. In the above-described configuration, the other-receiving-device-destined power correction value judging section 931 implements functions of a power correction value judging section.

Using the other-receiving-device-destined power correction value, the CQI measurement section 932 measures a CQI as a reception quality obtained when the other-receiving-device-destined signal is cancelled, and outputs the CQI measurement result to the feedback information generator 933. The feedback information generator 933 generates feedback information including: the other-receiving-device-destined power correction value received from the other-receiving-device-destined power correction value judging section 931; and CQI information after the cancellation of the other-receiving-device-destined signal, which has been received from the CQI measurement section 932, and outputs the feedback information to the multiplexer 223. In this embodiment, the feedback information generator 933 may output the other-receiving-device-destined power correction value and the CQI measurement result at different timings.

In the transmitting device of the fourth embodiment illustrated in FIG. 10, operations of a separation section 1041 and a power scaling processing unit 1042 are partially different. The separation section 1041 separates a feedback signal from a reception signal, and extracts the CQI information, Ack/Nack information, etc. included in the feedback signal; in addition, the separation section 1041 extracts the other-receiving-device-destined power correction value, and outputs the extracted value to the power scaling processing unit 1042. Using the received other-receiving-device-destined power correction value, the power scaling processing unit 1042 performs a power correction process on a signal for the other receiving device, thereby adjusting power distribution destined for a plurality of receiving devices to be multiplexed.

As described above, according to the fourth embodiment, in the user equipment serving as the receiving device, the power correction value capable of accurately canceling the other-receiving-device-destined signal serving as an interference signal can be judged by utilizing MCS information destined for the other receiving device, and the measurement of the CQI after the cancellation is enabled. In the base station apparatus serving as the transmitting device, power scaling can be controlled in accordance with the power correction value judged by using the MCS information destined for the other receiving device in the user equipment. Thus, based on the CQI measurement result after the interference signal cancellation, a transmission parameter such as MCS destined for each piece of user equipment can be set suitably, and furthermore, power scaling between a plurality of pieces of user equipment can be performed appropriately.

Fifth Embodiment

Figure 11:
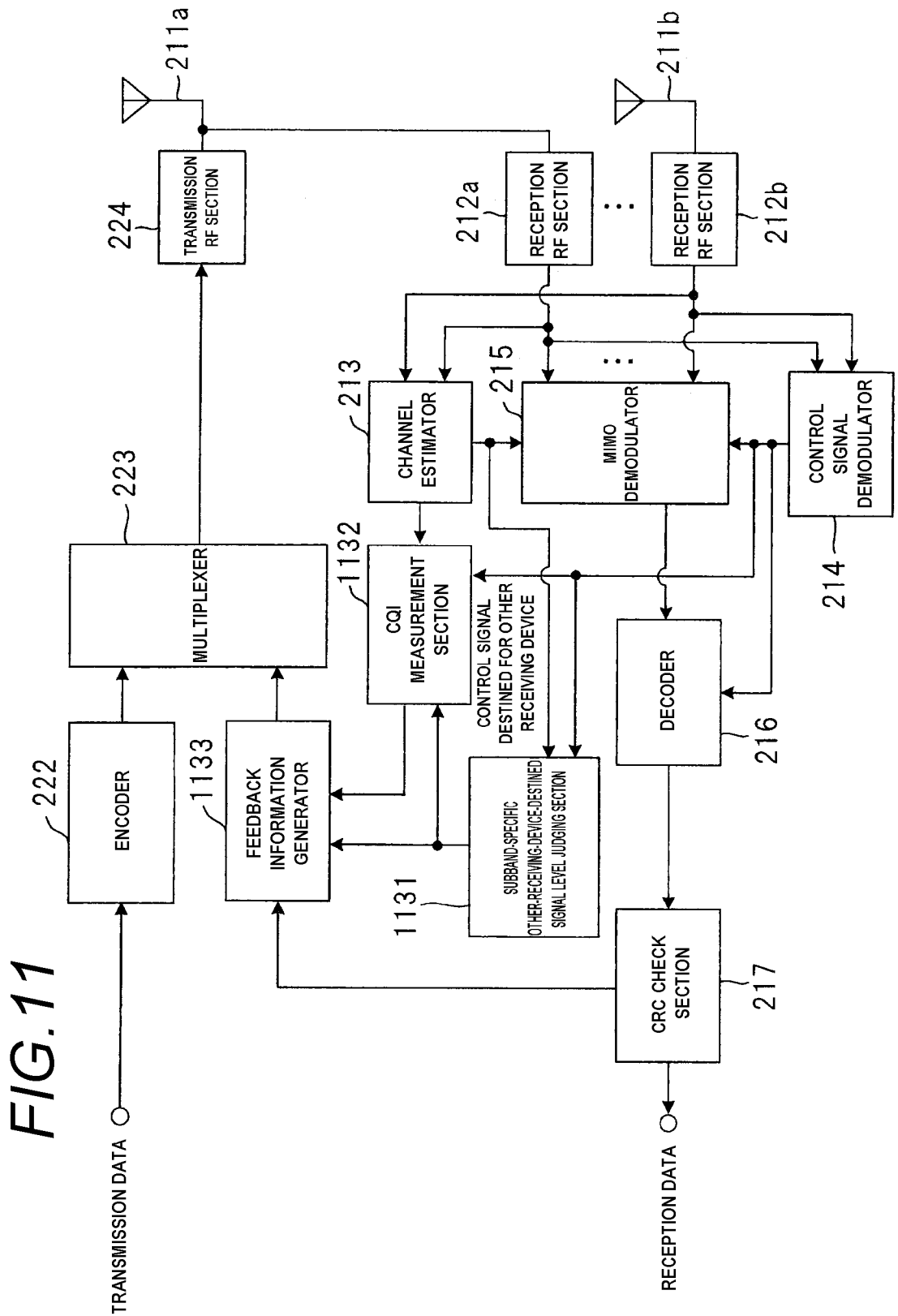
FIG. 11 is a block diagram illustrating the configuration of principal components of a receiving device in a wireless communication system according to a fifth embodiment of the present invention.
Figure 12:
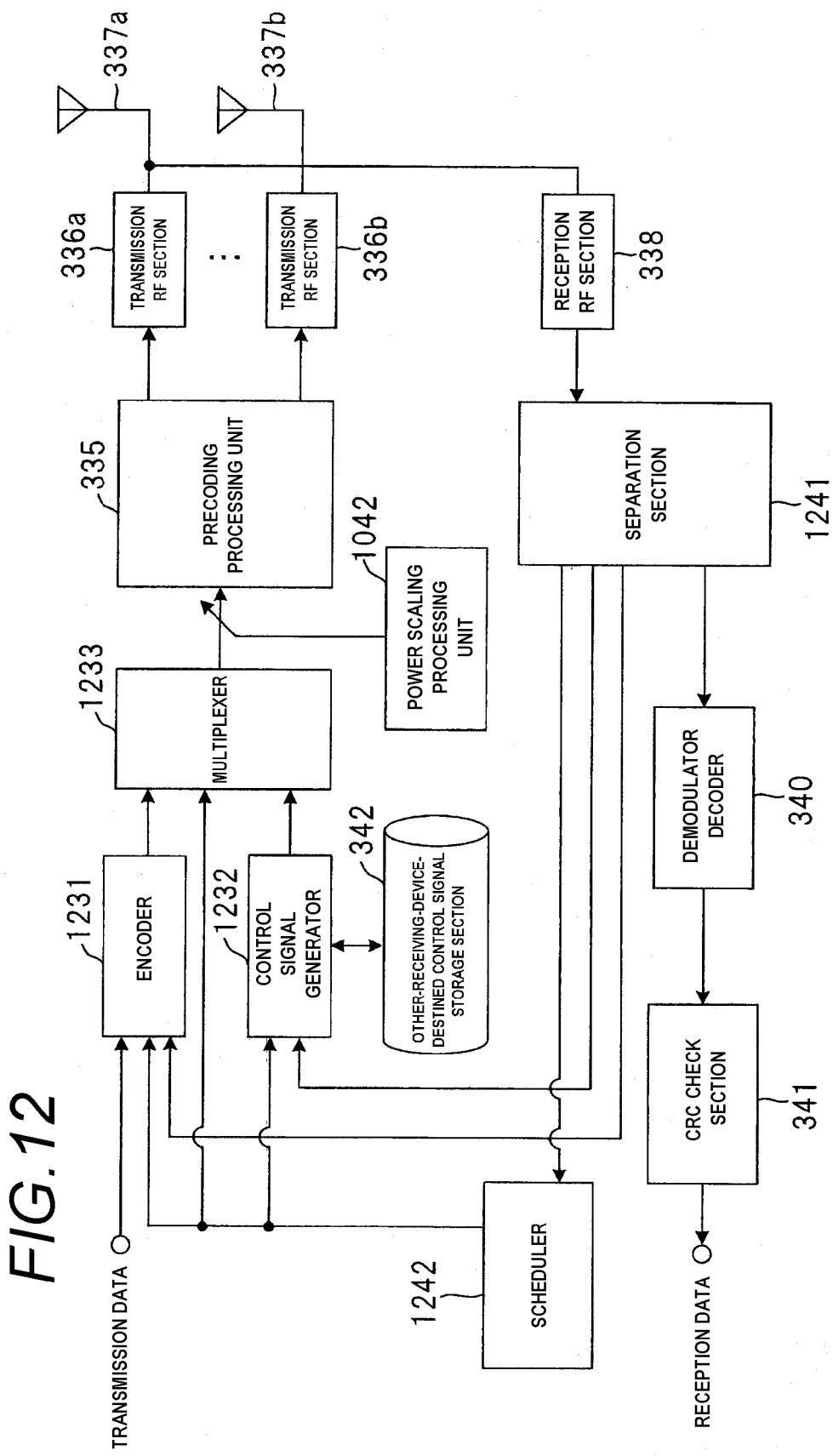
FIG. 12 is a block diagram illustrating the configuration of principal components of a transmitting device in the wireless communication system according to the fifth embodiment of the present invention.
Figure 13:
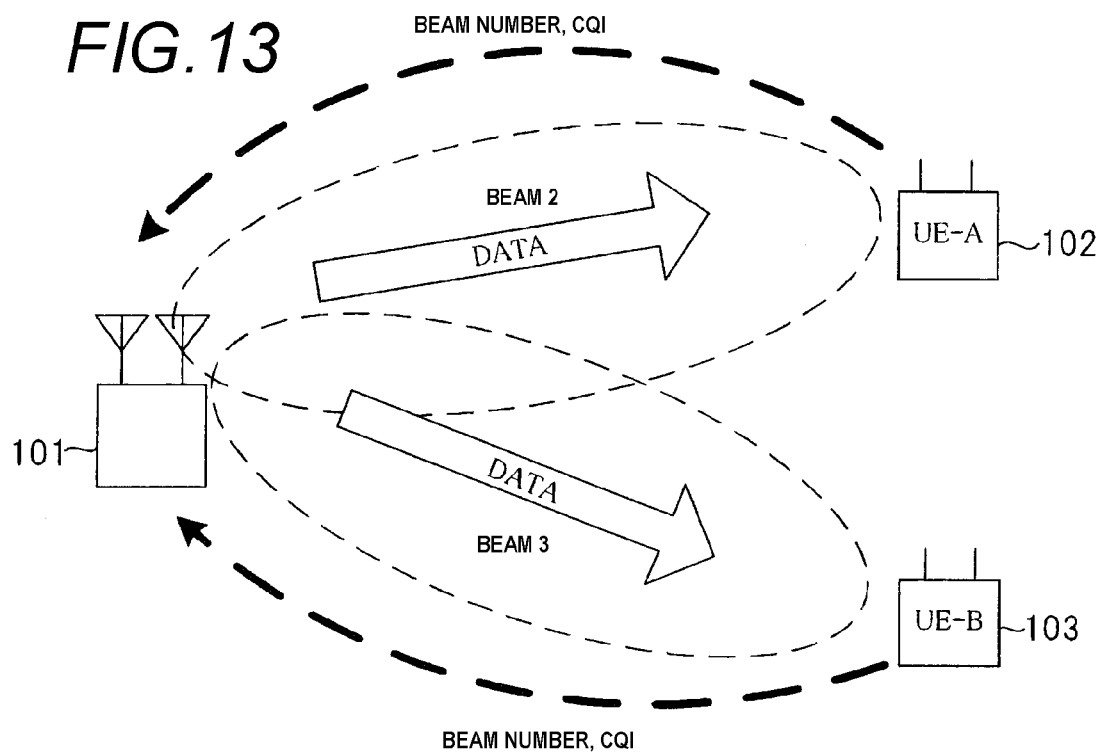
FIG. 13 is a diagram schematically illustrating data transmission carried out by multi-user MIMO.

FIG. 11 is a block diagram illustrating the configuration of principal components of a receiving device in a wireless communication system according to a fifth embodiment of the present invention, and FIG. 12 is a block diagram illustrating the configuration of principal components of a transmitting device in the wireless communication system according to the fifth embodiment of the present invention. It should be noted that in the fifth embodiment, components similar to those of the first embodiment are identified by the same reference characters, and detailed description thereof will be omitted.

In the fifth embodiment, when signals are transmitted through spatial multiplexing from the wireless base station to a plurality of pieces of user equipment in a multi-user MIMO mode, the user equipment (receiving device) having a cancellation capability acquires a transmission parameter (MCS) destined for the other user equipment (other-receiving-device-destined signal), and judges a frequency band capable of accurately canceling the other-receiving-device-destined signal serving as an interference signal in a receiving situation in which the relevant MCS is envisaged. In this embodiment, the transmission of an OFDM signal having a plurality of subbands is envisaged, and which of the subbands enables reception of the other-receiving-device-destined signal of the relevant MCS at a cancelable level is judged, i.e., the subband of the other-receiving-device-destined signal, by which the cancellation is enabled, is judged. Then, for this subband, a CQI indicative of a reception quality after the other-receiving-device-destined signal is cancelled is calculated, and the selected subband and the calculated CQI are fed back to the wireless base station (transmitting device) together with the capability of canceling the interference signal (e.g., presence or absence of a cancellation function). Due to the foregoing operation, scheduling, in which MCS information destined for the other user equipment is utilized, is enabled.

The receiving device of the fifth embodiment illustrated in FIG. 11 includes a subband-specific other-receiving-device-destined signal level judging section 1131. Moreover, operations of a CQI measurement section 1132 and a feedback information generator 1133 are partially different. In the present embodiment, the receiving device performs an operation for measuring the quality of each subband, and reporting the measurement result as a subband-specific CQI.

The subband-specific other-receiving-device-destined signal level judging section 1131 receives, from the control signal demodulator 214, a control signal destined for the other receiving device, acquires MCS of a transmission parameter, and judges a subband of the other-receiving-device-destined signal cancelable in a receiving situation in which the relevant MCS is envisaged. At this time, the subband-specific other-receiving-device-destined signal level judging section 1131 reads the modulation system for the other-receiving-device-destined signal, and estimates a receiving situation for each subband of the other-receiving-device-destined signal using a channel estimation value received from the channel estimator 213. Then, using the receiving situation estimation result, it is judged whether or not the other-receiving-device-destined signal can be cancelled accurately by each subband when the modulation system for the other-receiving-device-destined signal is envisaged. Thereafter, the judged result is outputted as cancellation-capable subband information to the CQI measurement section 1132 and the feedback information generator 1133. In this case, if the interference signal is known in advance, the higher the signal level, the easier the removal; therefore, a subband with a favorable reception capability will be selected as a cancellation-capable subband. In the above-described configuration, the subband-specific other-receiving-device-destined signal level judging section 1131 implements functions of a cancellation-capable frequency band judging section.

Using the cancellation-capable subband information, the CQI measurement section 1132 measures a CQI while considering whether or not the other-receiving-device-destined signal should be cancelled for each subband, and outputs the CQI measurement result to the feedback information generator 1133. The feedback information generator 1133 generates feedback information including: the cancellation-capable subband information received from the subband-specific other-receiving-device-destined signal level judging section 1131; and CQI information after the cancellation of the other-receiving-device-destined signal, which has been received from the CQI measurement section 1132, and outputs the feedback information to the multiplexer 223. In this embodiment, the feedback information generator 1133 may output the cancellation-capable subband information and the CQI measurement result at different timings. Furthermore, the cancellation-capable subband information may be frequency information combined with information of a subband, the allocation of which is desired based on the CQI measurement result.

The transmitting device of the fifth embodiment illustrated in FIG. 12 includes a scheduler 1242. Moreover, operations of a separation section 1241, an encoder 1231, a control signal generator 1232 and a multiplexer 1233 are partially different.

The separation section 1241 separates a feedback signal from a reception signal, and extracts the CQI information, Ack/Nack information, etc. included in the feedback signal; in addition, the separation section 1241 extracts the cancellation-capable subband information, and outputs the CQI information and cancellation-capable subband information to the scheduler 1242. Using the CQI information and the cancellation-capable subband information, the scheduler 1242 decides a subband allocated to the receiving device that is the relevant user equipment, and modulation system and encoding ratio. Then, all pieces of information on the allocated subband, modulation system and encoding ratio are outputted to the control signal generator 1232, the modulation system and allocated subband are outputted to the multiplexer 1233, and the encoding ratio is outputted to the encoder 1231. The control signal generator 1232 generates a control signal including the received information on the subband allocated to each receiving device, modulation system and encoding ratio, and outputs the control signal to the multiplexer 1233. The encoder 1231 performs an encoding process on transmission data using the received encoding ratio, and outputs the resulting data to the multiplexer 1233. The multiplexer 1233 performs a multiplexing process on a transmission signal including the encoded transmission data, the control signal including control information such as the allocated subband and MCS, etc. Then, the multiplexer 1233 performs a rate matching process, an interleave process, a modulation process and the like for setting a modulation multi-valued number and/or an encoding ratio adaptively, and outputs the result to the precoding processing unit 335.

As described above, according to the fifth embodiment, in the user equipment serving as the receiving device, the other-receiving-device-destined subband capable of canceling the other-receiving-device-destined signal serving as an interference signal is judged by utilizing MCS information destined for the other receiving device, and the measurement of the CQI after the cancellation is enabled. In the base station apparatus serving as the transmitting device, subband allocation destined for each piece of user equipment, modulation system, encoding ratio, etc. can be set by the scheduler based on the cancellation-capable subband information judged by the user equipment and the CQI measurement result. Thus, based on the CQI measurement result after the interference signal cancellation, scheduling destined for each piece of user equipment can be performed appropriately, and the multi-user diversity effect can be enhanced.

It should be noted that the present invention is not limited to the description of the foregoing embodiments, and it is anticipated that based on the disclosure of the specification and known techniques, those skilled in the art may make modifications to the present invention or find application of the present invention, which will be included in the scope of protection.

In each of the foregoing embodiments, the case where the present invention is implemented by hardware has been described by way of example, but the present invention may alternatively be implemented by software.

Further, each functional block used in the description of each of the foregoing embodiments is implemented as an LSI that is typically an integrated circuit. These functional blocks may be individually implemented as a single chip, or may be implemented as a single chip so as to be partially or entirely included therein. Although the term "LSI" is used herein, the term "IC", "system LSI", "super LSI" or "ultra LSI" may also be used depending on its integration density.

Furthermore, the implementation of an integrated circuit is not limited to LSI, but integrated circuit may be implemented using a dedicated circuit or a general-purpose processor. An FPGA (Field Programmable Gate Array) programmable after fabrication of an LSI and/or a re-configurable processor capable of re-configuring connections and settings of circuit cells within an LSI may be utilized.

Moreover, upon advent of an integrated circuit implementation technique for replacing LSI by the advance of semiconductor technology or a different technology derived therefrom, functional blocks may naturally be integrated using this technique. The possibility of adaptation of biotechnology, for example, is conceivable.

The present application is based on Japanese Patent Application No. 2007-332580 filed in Japan on Dec. 25, 2007, and Japanese Patent Application No. 2008-125873 filed in Japan on May 13, 2008, the contents of which are incorporated herein by reference.

INDUSTRIAL APPLICABILITY

The present invention has an effect capable of suppressing a reduction in transmission rate and improving transmission efficiency when power scaling is applied to multi-user MIMO, and is useful as a wireless communication apparatus, a wireless communication system, a wireless communication method, etc. applicable to MIMO (Multiple-Input Multiple-Output) or the like in which communication is performed using a plurality of antennas.

The invention claimed is:

1. A wireless communication apparatus used in a wireless communication system for performing communication from a transmitting device to a plurality of receiving devices including the wireless communication apparatus using a plurality of antennas, the wireless communication apparatus comprising:
    a reception quality calculator for receiving, from the transmitting device, control information destined for another receiving device of the plurality of the receiving devices, and for calculating, based on a transmission parameter destined for the other receiving device included in the control information, a reception quality of a signal destined for the wireless communication apparatus when a signal destined for the other receiving device is cancelled; and
    a feedback information transmission section for transmitting, to the transmitting device, feedback information including the reception quality after the signal destined for the other receiving device is cancelled.

2. The wireless communication apparatus according to claim 1,
    wherein the wireless communication apparatus comprises a cancellation capability notification section for notifying, in advance, the transmitting device that there is a capability of canceling the signal destined for the other receiving device.

3. The wireless communication apparatus according to claim 1,
    wherein the wireless communication apparatus comprises a demodulator for demodulating the signal destined for the wireless communication apparatus while canceling the signal destined for the other receiving device with respect to a reception signal using the transmission parameter destined for the other receiving device.

4. The wireless communication apparatus according to claim 1,
wherein the reception quality calculator receives, as the control information destined for the other receiving device, control information of a cell-edge-oriented signal of a cellular system, and calculates, based on a transmission parameter of the cell-edge-oriented signal included in the control information, the reception quality of the signal destined for the wireless communication apparatus when the cell-edge-oriented signal is cancelled.

5. The wireless communication apparatus according to claim 1,
wherein the wireless communication apparatus comprises a cancellation-capable bit number judging section for judging a cancelable bit number of the signal destined for the other receiving device in a receiving situation in which the transmission parameter destined for the other receiving device is envisaged,
wherein the reception quality calculator calculates, in accordance with the cancellation-capable bit number resulting from the judgment, the reception quality of the signal destined for the wireless communication apparatus when the signal destined for the other receiving device is cancelled, and
wherein the feedback information transmission section transmits, to the transmitting device, the feedback information including: the reception quality after the cancellation; and the cancellation-capable bit number.

6. The wireless communication apparatus according to claim 1,
wherein the wireless communication apparatus comprises a power correction value judging section for judging a power correction value capable of canceling the signal destined for the other receiving device in a receiving situation in which the transmission parameter destined for the other receiving device is envisaged,
wherein the reception quality calculator calculates, in accordance with the power correction value destined for the other receiving device resulting from the judgment, the reception quality of the signal destined for the wireless communication apparatus when the signal destined for the other receiving device is cancelled, and
wherein the feedback information transmission section transmits, to the transmitting device, the feedback information including: the reception quality after the cancellation; and the power correction value destined for the other receiving device.

7. The wireless communication apparatus according to claim 1,
wherein the wireless communication apparatus comprises a cancellation-capable frequency band judging section for judging a frequency band capable of canceling the signal destined for the other receiving device in a receiving situation in which the transmission parameter destined for the other receiving device is envisaged,
wherein the reception quality calculator calculates, in accordance with cancellation-capable frequency band information resulting from the judgment, the reception quality of the signal destined for the wireless communication apparatus when the signal destined for the other receiving device is cancelled for each frequency band, and
wherein the feedback information transmission section transmits, to the transmitting device, the feedback information including: the reception quality after the cancellation; and the cancellation-capable frequency band information.

8. A wireless communication mobile station apparatus comprising the wireless communication apparatus according to claim 1.

9. A wireless communication apparatus used in a wireless communication system for performing communication from the wireless communication apparatus to a plurality of receiving devices including a first receiving device and a second receiving device using a plurality of antennas, the wireless communication apparatus comprising:
a control information retaining section for retaining control information including a transmission parameter destined for the second receiving device other than the first receiving device;
a control information notification section for notifying the first receiving device of the control information destined for the second receiving device; and
a signal transmission section for receiving feedback information from the first receiving device to which the notification is provided, for setting a transmission parameter of a signal destined for the first receiving device based on a reception quality of the signal destined for the first receiving device, wherein the reception quality is included in the feedback information after a second-receiving-device-destined signal is cancelled in the first receiving device, and for performing spatially-multiplexed transmission after performing transmission power distribution for signals destined for the plurality of receiving devices.

10. The wireless communication apparatus according to claim 9,
wherein the control information retaining section retains, as the control information destined for the second receiving device, the control information including a transmission parameter of a cell-edge-oriented signal of a cellular system, and
wherein the control information notification section announces the control information of the cell-edge-oriented signal to the plurality of receiving devices within a cell of the cellular system.

11. The wireless communication apparatus according to claim 10,
wherein the signal transmission section sets the transmission parameter of the signal destined for the first receiving device based on the reception quality of the signal destined for the first receiving device when a cell-edge-oriented signal, included in the feedback information from the first receiving device to which the announcement is provided, is cancelled, and performs spatially-multiplexed transmission after performing transmission power distribution for the signal destined for the first receiving device and the cell-edge-oriented signal.

12. The wireless communication apparatus according to claim 9,
wherein the signal transmission section sets the transmission parameter of a signal destined for the first receiving device based on the feedback information,
wherein the feedback information comprises of: the reception quality of the signal destined for the first receiving device calculated when the second-receiving-device-destined signal is cancelled; and a cancellation-capable bit number indicative of the number of cancelable bits of the second-receiving-device-destined signal.

13. The wireless communication apparatus according to claim 9,
wherein the signal transmission section sets the transmission parameter of a signal destined for the first receiving device based on the reception quality of a signal destined for the first receiving device, and performs transmission power distribution for a plurality of receiving-device-destined signals based on a second-receiving-device-destined signal power correction value indicative of a power correction value included in the feedback information.

14. The wireless communication apparatus according to claim 9,
wherein the wireless communication apparatus comprises a scheduler for setting: frequency bands of signals destined for the plurality of receiving devices; and transmission parameters destined for the plurality of receiving devices, and
wherein the scheduler sets the transmission parameter of the signal destined for the first receiving device based on: the reception quality of the signal destined for the first receiving device; and cancellation-capable frequency band information indicative of a frequency band.

15. A wireless communication base station apparatus comprising the wireless communication apparatus according to claim 9.

16. A wireless communication system for performing communication from a transmitting device to a plurality of receiving devices including a first receiving device and a second receiving device using a plurality of antennas,
wherein the first receiving device includes:
a reception quality calculator for receiving, from the transmitting device, control information destined for the second receiving device, and for calculating, based on a transmission parameter destined for the second receiving device included in the control information, a reception quality of a signal destined for the first receiving device when a signal destined for the second receiving device is cancelled; and
a feedback information transmission section for transmitting, to the transmitting device, feedback information including the reception quality after the cancellation, and
wherein the transmitting device includes:
a control information retaining section for retaining the control information including the transmission parameter destined for the second receiving device;
a control information notification section for notifying the first receiving device of the control information destined for the second receiving device; and
a signal transmission section for receiving the feedback information from the first receiving device, for setting a transmission parameter of the signal destined for the first receiving device based on the reception quality of the signal destined for the first receiving device, wherein the reception quality is included in the feedback information after the second-receiving-device-destined signal is cancelled in the first receiving device, and for performing spatially-multiplexed transmission after performing transmission power distribution for signals destined for the plurality of receiving devices.

17. A wireless communication system used in a cellular system for performing communication from a transmitting device to a plurality of receiving devices including a first receiving device and a second receiving device using a plurality of antennas,
wherein the first receiving device includes:
a reception quality calculator for receiving, from the transmitting device, control information of a cell-edge-oriented signal of the cellular system, and for calculating, based on a transmission parameter of the cell-edge-oriented signal included in the control information, a reception quality of a signal destined for the first receiving device when the cell-edge-oriented signal is cancelled; and
a feedback information transmission section for transmitting, to the transmitting device, feedback information including the reception quality after the cancellation; and
wherein the transmitting device includes:
a control information retaining section for retaining the control information including the transmission parameter of the cell-edge-oriented signal;
a control information notification section for announcing the control information of the cell-edge-oriented signal to the plurality of receiving devices within a cell of the cellular system; and
a signal transmission section for receiving the feedback information from the first receiving device, for setting a transmission parameter of the signal destined for the first receiving device based on the reception quality of the signal destined for the first receiving device, wherein the reception quality is included in the feedback information after the cell-edge-oriented signal is cancelled in the first receiving device, and for performing spatially-multiplexed transmission after performing transmission power distribution for the signal destined for the first receiving device and the cell-edge-oriented signal.

18. A wireless communication method for performing communication from a transmitting device to a plurality of receiving devices including a first receiving device and a second receiving device using a plurality of antennas,
wherein the wireless communication method comprises a reception quality calculation step and a feedback information transmission step performed in the first receiving device,
the reception quality calculation step comprising: receiving, from the transmitting device, control information destined for the second receiving device; and calculating, based on a transmission parameter destined for the second receiving device included in the control information, a reception quality of a signal destined for the first receiving device when a signal destined for the second receiving device is cancelled,
the feedback information transmission step comprising transmitting, to the transmitting device, feedback information including the reception quality after the cancellation, and
wherein the wireless communication method comprises a control information notification step and a signal transmission step performed in the transmitting device,
the control information notification step comprising notifying the first receiving device of the control information including the transmission parameter destined for the second receiving device,
the signal transmission step comprising: receiving the feedback information from the first receiving device; setting a transmission parameter of the signal destined for the first receiving device based on the reception quality of the signal destined for the first receiving device, wherein the reception quality is included in the feedback information after the second-receiving-device-destined signal is cancelled in the first receiving device, and performing spatially-multiplexed transmission after performing transmission power distribution for signals destined for the plurality of receiving devices.

19. A wireless communication method used in a cellular system for performing communication from a transmitting device to a plurality of receiving devices including a first receiving device and a second receiving device using a plurality of antennas, wherein the wireless communication method comprises a reception quality calculation step and a feedback information transmission step performed in the first receiving device, the reception quality calculation step comprising: receiving, from the transmitting device, control information of a cell-edge-oriented signal of the cellular system; and calculating, based on a transmission parameter of the cell-edge-oriented signal included in the control information, a reception quality of a signal destined for the first receiving device when the cell-edge-oriented signal is cancelled, the feedback information transmission step comprising transmitting, to the transmitting device, feedback information including the reception quality after the cancellation, and wherein the wireless communication method comprises a control information notification step and a signal transmission step performed in the transmitting device, the control information notification step comprising announcing the control information including the transmission parameter of the cell-edge-oriented signal to the plurality of receiving devices within a cell of the cellular system, the signal transmission step comprising: receiving the feedback information from the first receiving device; setting a transmission parameter of the signal destined for the first receiving device based on the reception quality of the signal destined for the first receiving device, wherein the reception quality is included in this the feedback information after the cell-edge-oriented signal is cancelled in the first receiving device, and performing spatially-multiplexed transmission after performing transmission power distribution for the signal destined for the first receiving device and the cell-edge-oriented signal.

* * * * *

UNITED STATES PATENT AND TRADEMARK OFFICE
CERTIFICATE OF CORRECTION

PATENT NO. : 8,588,321 B2 Page 1 of 1
APPLICATION NO. : 12/809701
DATED : November 19, 2013
INVENTOR(S) : Hoshino et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this
Twenty-second Day of September, 2015

Michelle K. Lee
*Director of the United States Patent and Trademark Office*